United States Patent
Ramachandran

(10) Patent No.: US 7,712,656 B2
(45) Date of Patent: *May 11, 2010

(54) METHOD OF TRANSMITTING ELECTRONIC SIGNATURE DURING A FINANCIAL TRANSACTION

(75) Inventor: Natarajan Ramachandran, Uniontown, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/290,885

(22) Filed: Nov. 3, 2008

(65) Prior Publication Data

US 2009/0114718 A1 May 7, 2009

Related U.S. Application Data

(60) Continuation of application No. 11/787,382, filed on Apr. 16, 2007, now Pat. No. 7,445,155, which is a continuation of application No. 11/046,142, filed on Jan. 27, 2005, now abandoned, which is a division of application No. 10/688,545, filed on Oct. 17, 2003, now Pat. No. 6,905,072, which is a division of application No. 09/826,675, filed on Apr. 5, 2001, now Pat. No. 6,702,181, which is a division of application No. 09/076,051, filed on May 11, 1998, now Pat. No. 6,315,195.

(60) Provisional application No. 60/082,299, filed on Apr. 17, 1998.

(51) Int. Cl.
 *G07F 19/00* (2006.01)
(52) U.S. Cl. .............. 235/379; 235/462.45; 235/472.01
(58) Field of Classification Search ............ 235/462.45, 235/462.46, 379, 472.01, 472.02, 472.03
See application file for complete search history.

(56) References Cited

U.S. PATENT DOCUMENTS 7,445,155 B2 * 11/2008 Ramachandran ....... 235/472.01

\* cited by examiner

*Primary Examiner*—Karl D. Frech
(74) *Attorney, Agent, or Firm*—Ralph E. Jocke; Daniel D. Wasil; Walker & Jocke

(57) ABSTRACT

A transaction apparatus (10) includes a multifunction card (12) and a portable terminal (14). The multifunction card includes and a programmable memory (18). The programmable memory is used to store indicia corresponding to account data from a plurality of conventional magnetic stripe cards. The programmable memory further includes signature data representative of user-identifying signature. The signature data can comprise a scanned user-identifying written signature. A user can operate the apparatus to select one of the accounts stored in memory. The user can also use the apparatus to transmit the signature data via wireless communication during a transaction. The transmitted signature data can be compared to an actual user signature written on an electronic signature pad for a determination of correspondence.

20 Claims, 19 Drawing Sheets

FIG. 1
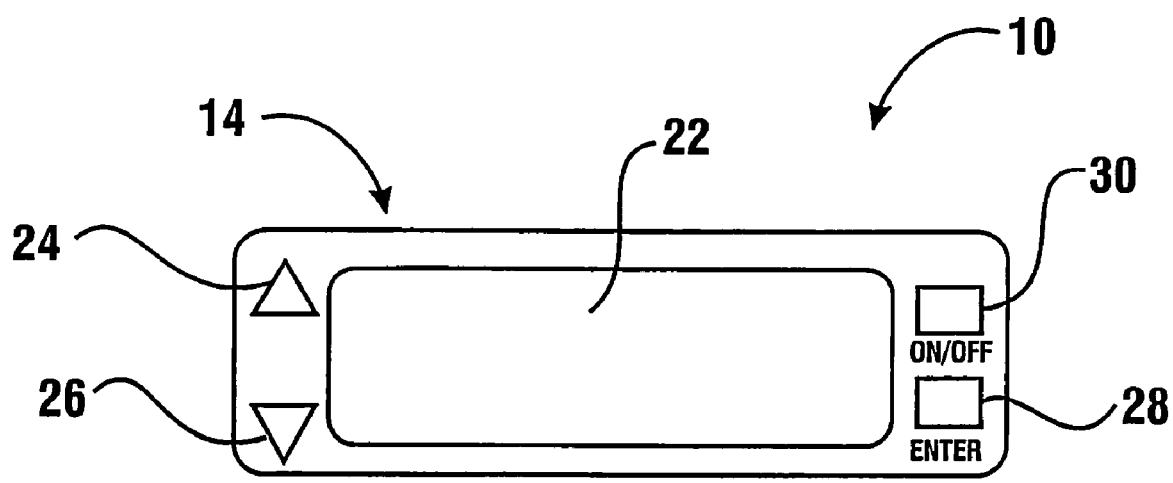
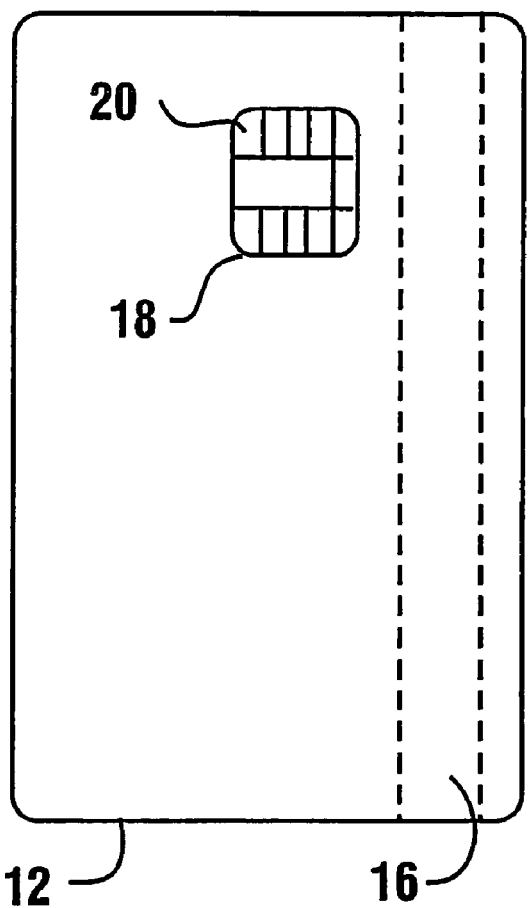

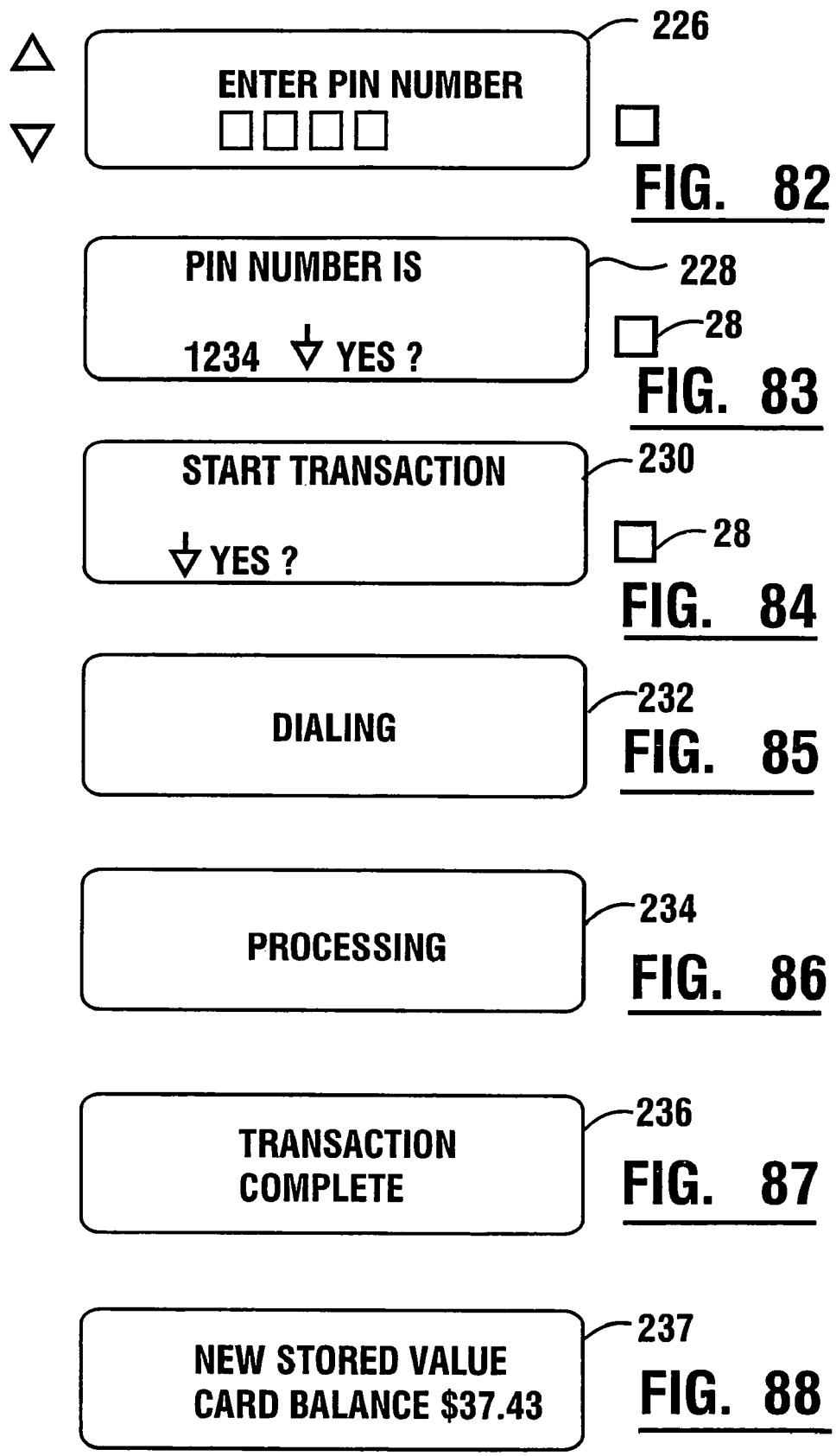

METHOD OF TRANSMITTING ELECTRONIC SIGNATURE DURING A FINANCIAL TRANSACTION

CROSS REFERENCE TO RELATED APPLICATIONS

This application is a continuation of U.S. application Ser. No. 11/787,382 filed Apr. 16, 2007, which is a continuation of U.S. application Ser. No. 11/046,142 filed Jan. 27, 2005, which is a divisional of U.S. application Ser. No. 10/688,545 filed Oct. 17, 2003, now U.S. Pat. No. 6,905,072, which is a divisional of U.S. application Ser. No. 09/826,675 filed Apr. 5, 2001, now U.S. Pat. No. 6,702,181, which is a divisional of U.S. application Ser. No. 09/076,051 filed May 11, 1998, now U.S. Pat. No. 6,315,195, which claims the benefit of U.S. Provisional Application 60/082,299 filed Apr. 17, 1998. The disclosures of all the foregoing Applications are herein incorporated by reference.

TECHNICAL FIELD

This invention relates to devices for conducting financial transactions. This invention relates to systems that can utilize information received from a data bearing record, such as a card. Specifically exemplary embodiments relate to a transaction apparatus and system which enables a single card with a programmable memory to be used as a substitute for a plurality of conventional credit cards, identification cards, benefit cards, and other objects which include indicia such as magnetic indicia or bar code. An exemplary financial banking system uses a computer to compare information read from a card with stored information to allow an individual to use a banking machine to reallocate funds among various accounts.

BACKGROUND OF INVENTION

The most common type of credit and debit cards in use today are magnetic stripe type cards. The standardized format used for such cards includes indicia on a front side of the card. Such indicia identifies the card owner, an account number, a card type, a card issuer, an expiration date as well as possibly other information. Such indicia is presented as raised letters and numbers which can be used to make an impression on a multipart carbon or carbonless form. The rear of such cards have a magnetic stripe supported thereon. The magnetic stripe includes several tracks of information. This information includes magnetic indicia representative of the information found on the front of the card as well as other information that is used in processing transactions electronically. Magnetic stripe cards are commonly used for credit card types such as MasterCard®, VISA®, Discover®, American Express®, Diner's Club® and others.

Most people also carry debit cards which allow them to access money in their checking and savings accounts using automated banking machines. Some debit cards also function as credit cards. Most debit cards in use today are magnetic stripe cards similar in format to credit cards.

Due to the convenience of using credit and debit cards most people carry several such cards in their wallet. Because of financial incentives associated with the issuance and sponsorship of credit cards, many users are offered cards by different banks, clubs, fraternal organizations and merchandising organizations. As a result it is not uncommon for people to have several different MasterCard® and VISA® accounts. This gives consumers the opportunity to take advantage of premiums such as frequent flyer miles and rebates offered by card sponsors. Having several different credit cards also enables consumers to take advantage of the credit limits on all their cards. While having many credit and debit cards is a benefit to consumers, it also requires them to carry several cards. It also exposes consumers to a greater risk if their wallet or purse that includes all their credit and debit cards is lost or stolen.

Most individuals also carry a number of other objects or cards which include machine readable indicia. These often include for example, a health insurance card which indicates that a person is a member of a particular group insurance plan. Such cards are often magnetic stripe cards similar to credit cards. Alternatively such health insurance cards may include bar code indicia or other visible indicia which can be read with a scanner. Some health insurance cards include both visible and magnetic indicia. Persons who are members of a health insurance plan can identify themselves and their account to medical providers by showing their card which can be read or scanned by appropriate devices.

Persons also commonly carry other types of cards with visible or magnetic indicia. These may include for example, library cards, identification or access cards, employee identification cards, student identification cards, driver's license cards, professional license cards and other types of cardlike objects. The magnetic or visible indicia on these cards is usually read when presented by the card holder to identify the person as an authorized user of services or facilities.

Another type of card which has been developed is the stored value card commonly referred to as a "smart card." Stored value cards are similar to credit and debit cards in construction in that they include a front side which has raised identifying indicia which can be transferred to a carbon or carbonless multipart form. Such cards also commonly include a magnetic stripe including magnetic indicia which enables the card to work like any other credit or debit card. Stored value cards also include a programmable memory mounted on the card. Such programmable memory stores data representative of cash value. The value on the stored value card can be used like cash by the bearer to purchase goods or services. The stored value data on the card is also often encrypted or stored using schemes to prevent fraud or tampering therewith.

Stored value cards, like debit and credit cards, require the customer to interact with a stationary terminal device to utilize the card. For example, in the case of credit cards, credit is obtained when the customer presents their card to a merchant. The merchant (unless they process transactions manually) utilizes a point of sale or electronic funds transfer terminal to charge an amount to the customer's account and credit the merchant's account. Similarly the use of a debit card requires that the user present their card to an automated banking machine such as an ATM. The ATM operates to add or deduct amounts from the user's account as funds are deposited or received by the user. Similarly, stored value cards are used in connection with a stationary terminal device such as an electronic funds transfer terminal or automated banking machine which has the special capabilities to handle the particular type of stored value card used. The terminal modifies the value information stored in memory on the card to reflect the addition or subtraction of value represented thereon as transactions are conducted.

Having to use a stationary terminal device to conduct transactions is often inconvenient. Most merchants only accept certain types of credit cards. Locating an ATM that accepts the debit card of a person's financial institution can be difficult. Often the use of a "foreign" card at another bank's ATM results in a significant service charge. It is also difficult to find a merchant or ATM that can process stored value cards.

Thus there exists a need for an apparatus and method that can reduce the number of credit, debit and other cards or cardlike objects that a person must carry while still obtaining the benefit of carrying all such cards and objects individually.

There further exists a need for an apparatus and method which changes the character of the indicia on a card so as to give a single card the ability to be used as a substitute for any one of a plurality of credit, debit or other cards.

Finally there further exists a need for an apparatus and method for carrying out transactions using a stored value card that does not require a user to interact with a stationary terminal device such as an automated banking machine, electronic cash register or an electronic funds transfer terminal.

OBJECTS OF EXEMPLARY EMBODIMENTS

It is a an object of an exemplary form of the present invention to provide a novel transaction apparatus.

It is a further object of an exemplary form of the present invention to provide a transaction apparatus which enables a user to use a single card which can be changed to conduct transactions using a plurality of the user's accounts.

It is a further object of an exemplary form of the present invention to provide a transaction apparatus which can be used in lieu of a plurality of credit, debit and other cards and objects.

It is a further object of an exemplary form of the present invention to provide a transaction apparatus that selectively displays visible indicia reproduced from a card or object, which visible indicia can be read by individuals or with a machine.

It is a further object of an exemplary form of the present invention to provide a transaction apparatus which can transfer value to or from a stored value card without the use of a stationary terminal device.

It is a further object of an exemplary form of the present invention to provide a transaction apparatus that is compact, portable and lightweight.

It is a further object of an exemplary form of the present invention to provide a transaction apparatus that can be configured in a manner which conforms to the shape of a conventional purse, wallet or keyfob and which may perform the functions thereof as well as the functions associated with carrying out transactions.

It is a further object of an exemplary form of the present invention to provide a transaction apparatus that authorizes operation based on a physical characteristic of an authorized user.

It is a further object of an exemplary form of the present invention to provide a transaction apparatus which includes a rechargeable power supply.

It is a further object of an exemplary form of the present invention to provide a transaction apparatus that is economical to produce and easy to operate.

It is a further object of an exemplary form of the present invention to provide a method for storing data about a plurality of accounts held by user in a single memory carried on a card.

It is a further object of an exemplary form of the present invention to provide a method for accessing data corresponding to plurality of accounts from the memory on a single card and selectively transferring such data to a magnetic stripe or visual display in connection with the card.

It is a further object of an exemplary form of the present invention to provide a method for selectively deleting and writing indicia corresponding to any one of a plurality of selected accounts onto the magnetic stripe of a single card.

It is a further object of an exemplary form of the present invention to provide a method for transferring value between a plurality of accounts and the memory of a stored value card without using a stationary terminal device.

Further objects of exemplary forms of the present invention will be made apparent in the following Detailed Description of Exemplary Embodiments and the appended claims.

The foregoing objects are accomplished in one exemplary embodiment of the invention by an apparatus which includes a card which is of a type which includes a magnetic stripe supported thereon. The magnetic stripe may be of a conventional configuration and capable of having magnetic indicia recorded or written thereon. The card also includes a programmable memory which is supported on the card. The programmable memory preferably includes data representative of a plurality of accounts which the user has, such as various credit card accounts, debit card accounts and other accounts.

The apparatus further includes a portable terminal. The portable terminal is preferably sufficiently small so as to be readily portable. The terminal may be incorporated into a wallet, purse or keyfob. The portable terminal is releasably engageable with the card and includes a memory reading device which is operative to read the account data from the memory on the card. The portable terminal also includes an input device which enables the user to select data from the card memory corresponding to any one of the plurality of the user's accounts. The portable terminal preferably further includes a magnetic writing device which enables the user to write magnetic indicia corresponding to a selected account in the programmable memory to the magnetic stripe on the card. This enables the user to use the card in place of the dedicated credit card for that particular account. The portable terminal further preferably includes a magnetic stripe erasing device which enables the user to erase the indicia from the magnetic stripe so that the user may subsequently write data corresponding to a different account to the magnetic stripe when desired.

The card memory may further include data representative of a stored amount. This amount represents a monetary value which the user may use as a cash substitute. The portable terminal device preferably includes a communications device which enables the user to make the transfers between the accounts for which data is held in memory and the monetary amount stored on the card. In addition the monetary amount stored on the card may be transferred using stationary terminals such as ATMs and point of sale terminals which have stored value card capabilities.

The card memory may further include data representative of visual indicia which are found on a plurality of cards or other objects associated with the user. The visible indicia may include for example, bar code indicia representative of a user's account with a group health plan. Alternatively such visible indicia may include bar code or other indicia associated with a student I.D., employee access card, driver's license or other types of objects. The visible indicia may also include a reproduction of the user's signature or other identifying characteristics. The portable terminal may include a display upon which the stored visible indicia may be reproduced in response to inputs to an input device. This enables visible indicia to be read with a machine from the display, which serves as a substitute for scanning off the card or object which the user is no longer required to carry. The card memory may also include data representative of icons or other graphics as well as data representative of instructions which are used by a processor in the portable terminal for carrying out transactions.

In some embodiments the portable terminal may further include object reading devices such as a magnetic stripe reader and a bar code scanner. Such devices are used to read magnetic indicia from the original credit and debit cards and to transfer such information may be stored in the programmable memory of the card used in connection with the invention. Similarly the object reader in the form of a scanner may read the visible indicia such as a bar code from an object so that such indicia may be stored in the memory on the card. The input device of the exemplary terminal is used to input designators which are stored in correlated relation with the data which corresponds to the various types of magnetic stripes and bar codes. The memory on the card may further include data representative of an access code as well as instructions to minimize the risk that an unauthorized user may gain access to the data stored in memory. Alternatively, the card memory may further include data uniquely associated with the user such as fingerprint data or other biometric data. The terminal may include a reader for reading such data to assure that the user is the person authorized to use the card.

The exemplary form of the invention enables a user to carry a single card which the user may use in lieu of a plurality of cards or other objects which the user would otherwise be required to carry. The exemplary form of the invention further enables a user to transfer amounts between a stored value card and their various accounts without having to use a stationary terminal such as a point of sale terminal or an automated banking machine.

BRIEF DESCRIPTION OF DRAWINGS

FIG. 1 is a top plan view of one embodiment of a transaction apparatus of the present invention including a multifunction card and a portable terminal.

FIGS. 75-88 are screens displayed on the portable terminal and associated with the logic flow for transferring value from the programmable memory on the multifunction card to a selected user account.

DETAILED DESCRIPTION OF EXEMPLARY EMBODIMENTS

Figure 2:
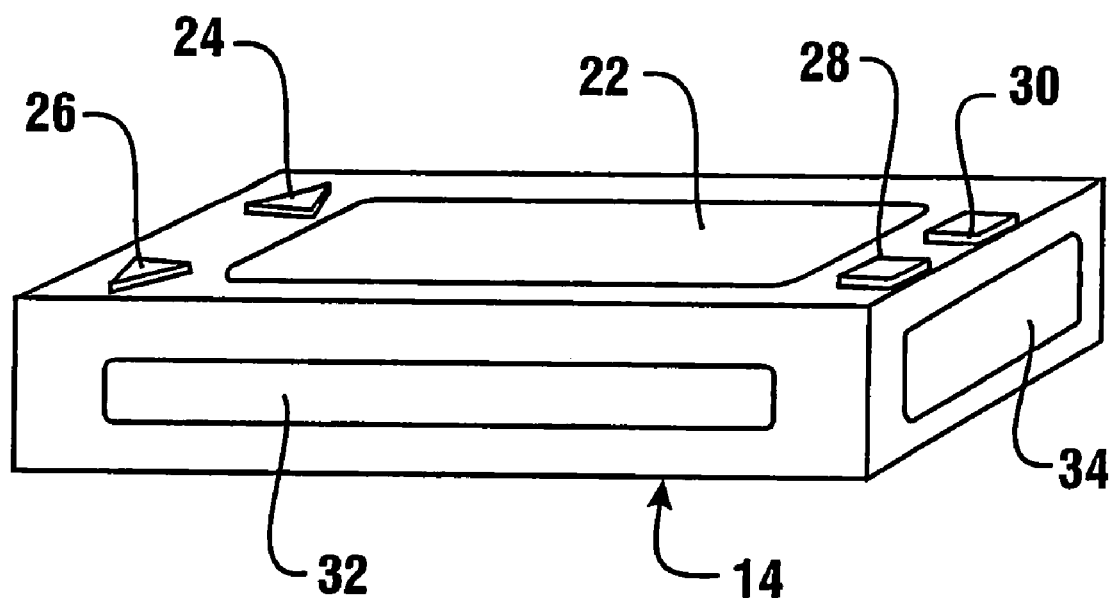
FIG. 2 is an isometric view of the portable terminal of the type shown in FIG. 1.

Referring now to the drawings and particularly to FIG. 1 there is shown therein a transaction apparatus of one exemplary embodiment of the present invention generally indicated 10. The apparatus includes a multifunction card 12 and a portable terminal 14. The exemplary portable terminal and multifunction card are releasably engageable in a manner later discussed to enable carrying out a plurality of functions and transactions.

The multifunction card 12 may have the dimensional configuration of conventional credit and debit cards. It includes a magnetic stripe 16 on a rear face thereof. The magnetic stripe is capable of holding magnetic indicia similar to the magnetic stripes on conventional debit, credit and similar cards. Like the stripes on such cards, magnetic stripe 16 is also preferably capable of having the magnetic indicia thereon erased with an erase head or similar device, and having new indicia recorded or written thereon.

Multifunction card 12 further includes a programmable memory 18 supported thereon. Programmable memory 18 includes a plurality of electrical or other contacts 20 which are accessible on the front of the card. In the exemplary embodiment the card and programmable memory are a type and configuration such as is commercially available from a number of suppliers including Diebold, Incorporated, the Assignee of the present invention. The contacts 20 and the magnetic stripe 16 are positioned in predetermined locations on the card to enable the card to be used with a variety of devices. Of course in other embodiments of the invention nonconventional orientations and configurations of the magnetic stripe and the programmable memory contacts may be used.

As later explained, multifunction card 12 is designed to be used as a substitute for a plurality of varied types of credit, debit and other cards. However in embodiments of the invention, card 12 may include information on the face or rear thereof so as to identify the particular user to whom the card belongs, an issuer of the card, as well as other data. In some embodiments, the front side of the card may include raised numbers and letters corresponding to a particular credit card account and from which an impression may be made onto a carbon or carbonless form. For example information on the face of the card may correspond to a user's MasterCard®, VISA®, American Express®, Discovery®, Novus®, Diner's Club® or other card. This enables the exemplary multifunction card to be used as the user's regular credit card when purchasing goods or services in establishments that do manual processing of credit card transactions. Of course while in the embodiment discussed conventional credit card indicia may be included on the front of the multifunction card, in other embodiments special indicia may be presented on the card.

Portable terminal 14 includes a display 22 on the front face thereof. In one exemplary form of the invention display 22 is an LCD type display or other suitable display that may be used for displaying words, graphics and other visible indicia in a manner later explained. Portable terminal 14 further includes at least one input device that may be used to input information by a user. In the embodiment shown, the input device includes a manual input device which consists of a plurality of buttons. These buttons include a scroll up button 24 and a scroll down button 26. These scroll up and scroll down buttons 24, 26 which may be referred to hereafter as "up button" and "down button" respectively, are pressed by a user to selectively display items on the display.

The input device of the terminal further includes an enter button 28. The enter button is used in a manner later explained to initiate execution of a function corresponding to the information displayed on display 22. Terminal 14 further includes an on/off button 30. Button 30 is preferably used in the manner later explained to initiate a transaction or to signify completion of a transaction and to turn the terminal off. It should be understood that the input device comprised of manual input buttons 24, 26, 28 and 30 are exemplary only and that other embodiments of the invention may incorporate other arrangements of manual and other types of input devices.

As shown in FIG. 2 portable terminal 14 further includes a slot 32. Slot 32 extends through the body of the terminal and is sized to enable multifunction card 12 to be passed therethrough. An exemplary form of the portable terminal includes an external object reading device 34 positioned on the exterior of the terminal body. In one form of the invention the external object reading device may include a bar code reader which enables reading bar code off of cards and other objects so that information corresponding to such visible indicia may be read and stored in the memory of the multifunction card.

Figure 4:
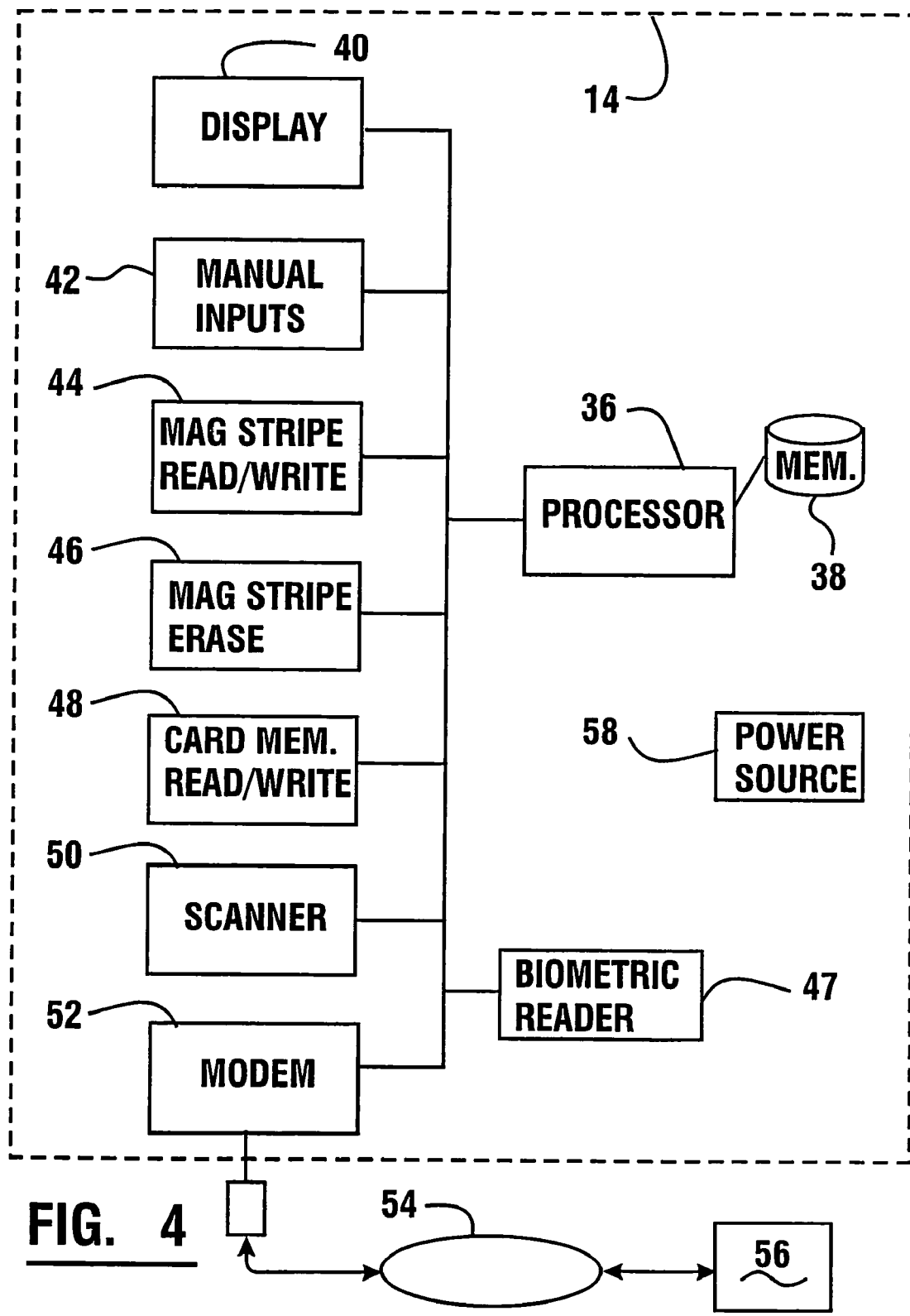
FIG. 4 is a schematic view of the components of the portable terminal as well as a system through which the portable terminal communicates.

The components which comprise an exemplary embodiment of the portable terminal 14 are schematically indicated in FIG. 4. Terminal 14 includes at least one onboard processor 36 which is in operative connection with the other components of the portable terminal. Processor 36 is also in connection with at least one data store or memory 38. Memory 38 may be a volatile or nonvolatile memory which is capable of holding and recovering data which is received from or delivered to the processor 36.

Processor 36 is in operative connection with other components within the portable terminal 14. These components are represented schematically in FIG. 4 and are indicative of hardware and software components operatively connected with the processor. These components include the display component 40. Display component 40 includes display 22 as well as the other hardware and software devices which enable the display to provide visual outputs in response to processor 36. A manual input component 42 corresponds to a manual input device which in the described exemplary form of the terminal includes buttons 24, 26, 28 and 30. Component 42 includes the hardware and software which enables communicating the inputs from the user through the buttons to the processor so that the processor may carry out the functions of the portable terminal in response thereto.

Portable terminal 14 further includes a magnetic stripe read and write component 44. In the exemplary form of the invention this component includes magnetic heads which are selectively operated to read magnetic indicia from the stripe of a card as well as to write magnetic indicia thereto. It should be understood while component 44 shows these functions as combined, it actually represents two separate functions. These are the functions of reading magnetic indicia from a card and writing magnetic indicia to a card stripe. These functions may be separate in other embodiments. Component 44 includes the necessary hardware and software interfaces to the processor 36 to carry out these functions in a manner later discussed. A magnetic stripe erase component 46 is further indicated schematically as part of the portable terminal FIG. 4. This magnetic stripe erase component includes an erase head or other comparable device as well as the hardware and software devices that may be used to selectively erase or otherwise clear magnetic indicia from the magnetic stripe of the multifunction card. In some embodiments of the invention the magnetic stripe erase component may be combined with the components which function to read and write indicia to the magnetic stripe of cards. In the exemplary form of the invention the heads which operate to read, write and erase magnetic stripe indicia from credit cards are positioned in the interior of terminal 14 and adjacent to slot 32. This enables the reading, writing and erasing functions to be carried out as a card is passed manually therethrough. It should be understood however that in other embodiments other methods may be provided for reading, writing and erasing magnetic stripe data.

As shown in FIG. 4 portable terminal 14 further includes a card memory read/write component 48. Component 48 serves to read and write data to the programmable memory 18 on multifunction card 12. In the embodiment shown the memory reading and writing functions are combined. However it should be understood that these are separate functions and may be carried out through separate arrangements of hardware and software. Component 48 also includes electrical contacts which are positioned adjacent to slot 32 in the portable terminal. These electrical contacts are configured to engage the contacts 20 which enable communication with the programmable memory 18 of the multifunction card 12. Component 48 further includes the hardware and software devices required to read data from and write data into the programmable memory on the card.

Portable terminal 14 in the embodiment shown includes a scanner component 50. Scanner component 50 includes bar code scanner 34 or similar device for reading visible indicia from an object. Component 50 further includes the hardware and software devices necessary to communicate with processor 36 and the other components of the portable terminal. It should be understood that while the embodiment of the portable terminal shown includes object reading devices for reading magnetic stripe indicia, visual indicia and indicia stored in the programmable memory of cards, other embodiments of the invention may include other types of object reading devices. Likewise other types of object writing devices may be included depending on the particular uses made of the portable terminal.

For example in some embodiments scanner 50 may be a scanner suitable for scanning and reading written indicia. This may include the signature of an authorized user. Data representative of such a signature may be input and produced with the scanning device and stored in the programmable memory of the card. The signature may then be reproduced on the display or transmitted to a remote location for purposes of identifying the authorized user or the authenticity of a transaction.

Alternative embodiments of the invention may include a biometric reader component 47. The biometric reader component may include hardware and software components that can be used to sense a characteristic of a user which uniquely identifies the person as an authorized user. In some embodiments the biometric reader component 47 may include a fingerprint reading device. Alternatively, the reader may include an audio input device which can be used to identify a user by voice. Alternatively, visual readers for identifying unique visible features, or a combination of identifying features of the user may be used. The programmable memory of the card may include data representative of the identifying biometric features of the authorized user or users. This stored data is used to enable authorized users of the card to operate the terminal with the card while others are prevented from such operation.

Terminal 14 in the embodiment shown includes a communications component 52. Communications component 52 may include a modem or other communications devices that are selectively operative under the control of the processor to communicate with other systems and devices located outside and preferably remote from the portable terminal. In some embodiments the communications component 52 may include a connector for communicating through a network 54 to a computer or similar device at a remote location, schematically indicated 56. A connection to the remote location may be selectively made based on an address which is used by the communications component 52 to selectively communicate to the desired remote location.

In one form of the invention the communications component includes a wireless type modem. In such an embodiment network 54 includes a cellular phone network which enables communicating to a transaction network. This is done through computers located at one or more remote addresses which are accessed via a phone number which serves as the address. Alternatively communications component 52 may communicate through a conventional telephone access port which includes a telephone connector on the body of the portable terminal. In other embodiments the communications network 54 may include communications intranets or public networks such as the internet, which selectively enable communication by the portable terminal to selected nodes in the network. In such environments the addresses to which the portable terminal communicates are the addresses of the network nodes which may properly receive transaction messages.

As shown in FIG. 4 the portable terminal includes a power source schematically indicated 58. Power source 58 may include any suitable source of power for the components in the portable terminal. Suitable power sources may include rechargeable or nonrechargeable batteries or connectors to external power sources such as the cigarette lighter of a vehicle. The power source 58 may further include a renewable energy source, such as a solar panel 60 which may be used to provide energy from the sun or other available light source.

Figure 3:
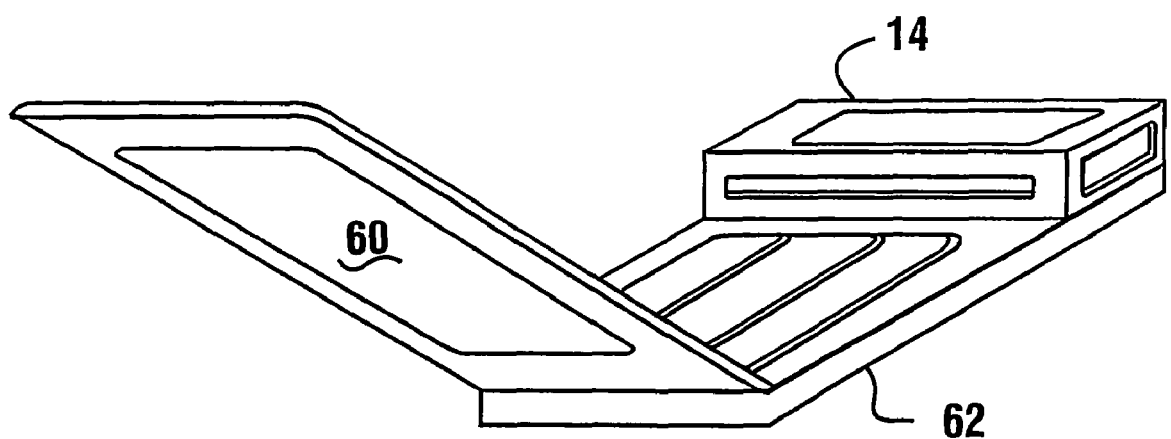
FIG. 3 is an isometric view of the portable terminal shown in FIG. 2 in combination with a wallet structure.

As shown in FIG. 3 portable terminal 14 may be integrated into a carrier 62 which may take the form of a wallet such as that shown in FIG. 3. Alternatively the carrier may be of a type which performs other functions such as those of a purse, personal digital assistant, notebook computer, keyfob, pager, cellular phone or other component carried by a user. As demonstrated by the carrier 62 shown in FIG. 3, the portable terminal 14 may be integrated into a wallet type device which includes spaces for holding the multifunction card as well as other credit cards and identification cards. The carrier may further include spaces for holding cash, keys and other items in a manner of a conventional wallet. Similarly the carrier 62 may include a supporting surface for the solar panel 60 as well as other features and components which may be desired by a user. The small size and portability of the terminal 14 of the exemplary embodiment enables it to be integrated into any one of a plurality of carrier type devices while still enabling such devices to carry out their traditional and/or nontraditional functions.

In an exemplary form of the invention the portable terminal 14 operates to perform a plurality of functions. These functions are carried out based on instructions which may be included in whole or in part in the programmable memory 18 of the multifunction card 12. The processor 36 of the portable terminal 14 carries out instruction steps in response to the inputs provided by the user of the card and portable terminal. In embodiments of the invention the memory 38 in connection with the portable terminal may also include certain programmed instructions which are permanently stored therein so as to facilitate certain operations of the terminal. The programmable memory on the card may also include the data representative of accounts, indicia, access codes, monetary values, graphics, location data and other information which is used in the operation of the apparatus.

In one exemplary embodiment of the invention the functions which are enabled to be executed include adding a new card to the memory. This is accomplished by reading information off of a magnetic stripe of an existing dedicated card with the portable terminal and storing it in the programmable memory of the multifunction card. This information can be recovered later and the magnetic indicia written on the magnetic stripe of the multifunction card.

Another function executed in an exemplary embodiment of the invention is to selectively delete card data from the memory on the card. This could be done for example when a user no longer desires to use the multifunction card as a substitute for the dedicated card.

Another function or an exemplary embodiment of the invention is to write the indicia stored in the memory of the magnetic stripe card onto the magnetic stripe of the multifunction card or perhaps another magnetic stripe card.

Another function which is carried out in an exemplary embodiment of the invention is to add visual indicia such as a bar code to the memory of the multifunction card. Likewise, another function is to delete a bar code or other visual indicia stored in the card memory. A further function is to display one of the selected visual indicia such as a bar code or a user's signature which is stored in the memory of the card.

Other functions of embodiments of the invention may be to carry out financial transactions without the need to use a stationary terminal. Such functions include checking the cash equivalent value stored in the memory of the multifunction card. Another transaction is to transfer value stored in the memory of the multifunction card to another account. The transfer of funds from an account to the programmable memory on the multifunction card so that it can be used as a cash equivalent therefrom is a further transaction which may be carried out by embodiments of the invention.

Figure 95:

The various functions which the described embodiments of the transaction apparatus may carry out and the logic associated therewith are now explained with reference to FIGS. 5-95 which disclose transaction steps carried out by a user in executing the various functions. In the form of the invention described, the programmable memory 18 on the card includes data representative of prompt messages. When the multifunction card 12 is extended in the terminal so that the contacts 20 thereon can be read by the connectors of the card memory read/write component 48, the stored instructions which include the prompt messages and the associated logic may be read. The processor 36 then operates the display component 40 to selectively display prompt messages on the display 22 of the terminal 14.

In an exemplary form of the invention security measures are provided to assure that only a proper authorized user is enabled to operate the system. This may be accomplished by requiring a user to input an access code which is known only to them before the terminal functions may be accessed. This access code may be programmed in the programmable memory 18 using a separate terminal device. Alternatively provisions may be made for executing a software program which enables the user to select their access code the first time that the multifunction card is used in connection with the portable terminal. This program may be stored in the memory of the terminal or on the card. In alternative embodiments the card holds biometric data related to authorized users. The biometric data of a user is input through the biometric reader 47. For example, when the reader 47 includes a fingerprint reader a user may place a predetermined finger adjacent to the reader. If the input data corresponds to an authorized user, the terminal may be operated. In some embodiments the user may scan a single fingerprint to gain access. The particular finger selected may be one chosen by and known only to the user. In other embodiments a plurality of fingerprints from one or both hands, may need to be read in a selected order. This may increase the security level.

One form of the logic flow associated with assuring that an authorized user uses the apparatus of the invention is demonstrated with reference to FIGS. 89-95. In initiating the operation of the terminal the user is first required to place the multifunction card 12 in the slot 32 of the portable terminal 14. The card is preferably inserted into the slot in a manner which enables the electrical connectors associated with component 48 to engage the contacts 20 on the card. The slot corresponds closely to the width of the card and serves as a guide for positioning the card as it is passed therethrough. A spring loaded finger or other releasable stop may be positioned adjacent the slot to stop the card at the proper depth inside the terminal to engage the contacts. The user preferably knows how to insert the card into the slot in order to achieve this connection based on experience. Alternatively, instructions printed on the face of the card and/or the terminal may instruct the user in how to insert the card. The memory 38 in the terminal 14 may also include data representative of prompts which are displayed on the screen 22 which instruct the user on how to properly insert the multifunction card.

Figure 89:
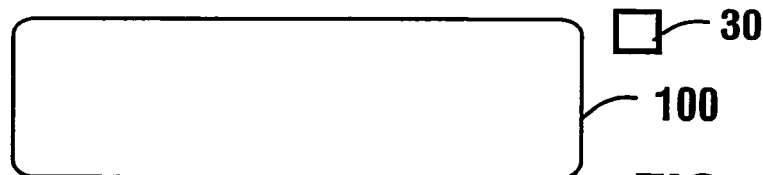
FIGS. 89-95 are screens displayed on the portable terminal and associated with the logic flow for assuring that a user is authorized to use the terminal.
Figure 90:
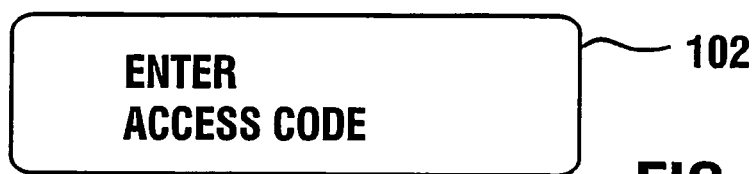
Figure 91:

For purposes of this example, the sign on process for a user preferably begins with the display screen 100 shown in FIG. 89. Screen 100 is a blank screen which indicates that the terminal is off. When the user presses the on/off button 30 a screen 102 shown in FIG. 90 is displayed. Screen 102 preferably includes a prompt which instructs the user to enter their access code.

Figure 92:
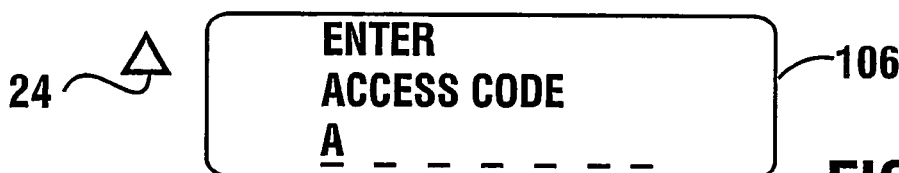
Figure 93:
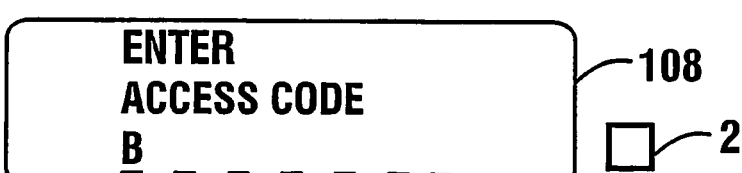

The entry of the user's personal access code is demonstrated in FIG. 91-94. In entering the access code of the embodiment shown, the user starts with a screen 104 shown in FIG. 91. Screen 104 includes seven spaces in which the user may input alphabetical or numerical characters which make up the access code. Pressing the up button 24 when screen 104 is displayed begins a scrolling process in the first space for input of the access code. This causes the screen to change the first space from a blank space to the letter "a." This is shown in FIG. 92 and is represented by a screen 106. Pressing the up button 24 again (or continuing to hold it) changes the first character to the letter "b" as indicated by a screen 108 in FIG. 93. The user may move to subsequent letters by holding or repeatedly pushing the up button, thus scrolling through the alphabet and/or numerical values until the desired first character of the access code is displayed in the first space. Of course the user may scroll backwards by pushing the down button. In this example the letter "b" is the first character of the user's access code and the user indicates that fact by pressing the enter button 28 as schematically indicated in FIG. 93.

After the first character is entered the user selects the second character of the access code in a similar manner. This is again done by selectively pressing the up and down buttons 24 and 26 until the desired alphabetical or numerical character is displayed in the second space. Once the desired character is displayed in the second space the user presses the enter button 28 to move to the next character. This is represented by screen 110 in FIG. 94. In the embodiment shown the user may enter up to seven characters as the access code. However in the exemplary embodiment the user may not require seven characters and may simply choose to leave certain characters as blanks. In the embodiment shown the user's access code is the five letter word "broom" and the two final characters are simply left blank. After the user indicates this by pressing the enter button 28 to leave blanks for the last two characters, a screen 112 shown in FIG. 95 is displayed.

In screen 112 the user is given the option of either changing their access code or proceeding to a main menu. The user may select the option of changing their access code by pressing the up button 24. This will lead the user through a series of prompt screens to enter a new access code. This series of prompt screens may lead the user through appropriate steps in accordance with the instructions stored in the memory on the card or in the terminal so as to enter a new code. In alternative embodiments of the invention a biometric identifier may be used as an access code. In such a system the user would be prompted through the display 40 to input identifying biometric data to the biometric reader 47. For example, if the biometric reader is a fingerprint reader, the user may be prompted to bring a finger that they have preselected adjacent to the reader. The reader 47 would read the fingerprint and produce suitable signals to compare the input data to the data stored on the card. If the input data corresponds to an authorized user, the user is authorized to further operate the terminal. The user may be given the option to change the biometric data, such as to add data for another authorized user, or to change the finger used for providing fingerprint data in the accessing process or to use a sequence of fingerprints to obtain access.

Alternative embodiments may use other processes and criteria to access the card data. Once the user has properly gained access they may be given the option of changing the access code or other sign on procedures. For purposes of this example however the user chooses the option of displaying a main menu which is selected by pressing the down button 26 as indicated schematically in FIG. 95.

Figure 5:
FIGS. 5-14 are views of exemplary function selection screens through which a user may select functions to be executed using the transaction apparatus.
Figure 6:
Figure 7:

The prompt messages in FIGS. 5-13 represent a main menu showing the various transactions that can be conducted with the apparatus. FIG. 5 shows a screen 64 which includes a prompt which queries a user as to whether they wish to add a new card to the memory on the multifunction card. In the embodiment shown the fact that additional options are available by scrolling up or scrolling down are indicated by a dual pointed arrow adjacent to the text displayed. By pressing the down button 26 as indicated schematically, the user may move to screen 66 shown in FIG. 6. This screen indicates the availability of the selection of the transaction to delete a card from memory. Pressing the down button again causes the display of the terminal to provide the screen 68 shown in FIG. 7. This screen provides a prompt corresponding to the transaction in which data stored in the programmable memory of the multifunction card is written to a magnetic stripe.

Figure 8:
Figure 9:
Figure 10:
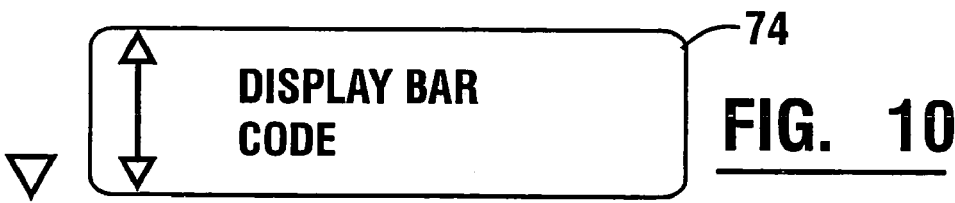

Scrolling with the down button 26 from screen 68 causes screen 70 in FIG. 8 to be displayed. Screen 70 includes a prompt corresponding to a transaction in which bar code is added to the programmable memory of the multifunction card. FIG. 9 discloses a screen 72 which may be displayed by scrolling with the down button from screen 70. Screen 72 corresponds to deleting a bar code from the memory on the multifunction card. Screen 74 shown in FIG. 10 includes a prompt to the user which enables selection of a transaction in which bar codes stored in the memory may be displayed.

Figure 11:
Figure 12:
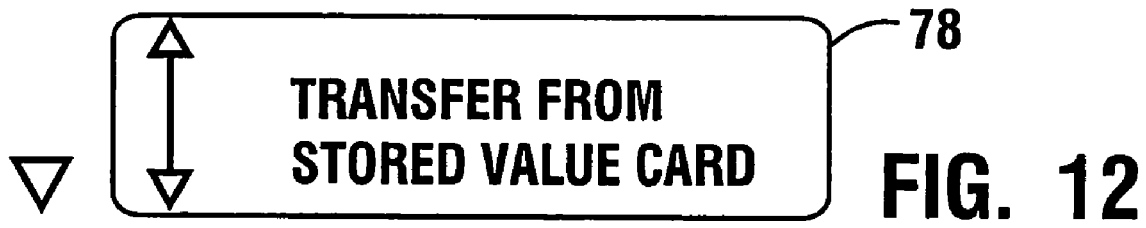
Figure 13:
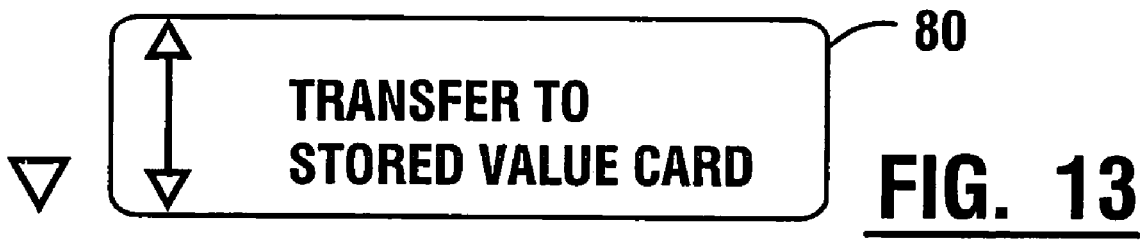

FIG. 11 shows a screen 76 which includes a prompt which corresponds to a transaction in which a user may check the cash value represented by data stored on the programmable memory of the card. Such data corresponds to a cash value which enables the multifunction card to be used in a manner identical to cash. From FIG. 11 a user may scroll to a screen 78 shown in FIG. 12 which prompts the user to select an available transaction in which value may be transferred from the stored value on the multifunction card. FIG. 13 shows a screen 80 with a prompt which enables the user to select a transaction in which value will be transferred onto the memory of the multifunction card.

Figure 14:
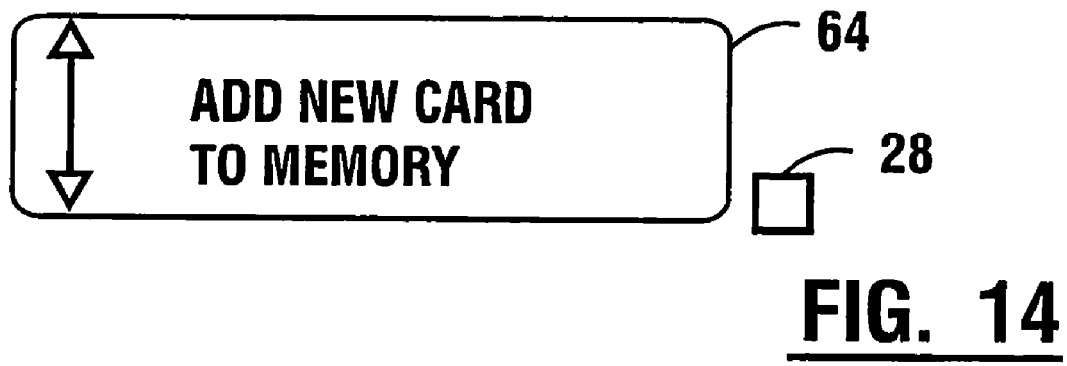

In the exemplary form of the invention the prompts in the screens of the main menu enable scrolling back to prior screens either by pushing the up or down buttons. As shown in FIG. 13 by pressing the down button from screen 80 the user causes the first screen 64 to again be displayed. Of course the user can move up and down by pressing buttons 26 and 24 which enables them to select any of the transactions available in the main menu. For purposes of a first example if a user wishes to add a new card to memory they can manually depress the enter button 28 of the input device as represented schematically in FIG. 14. Pressing the enter button 28 from screen 64 causes the processor 36 to begin executing the instructions stored in the programmable memory of the card and/or memory 38 of the terminal to add a new card into the memory.

Figure 15:
FIGS. 15-24 are examples of screens displayed on the portable terminal and associated with the logic flow for adding a new card type to the programmable memory on the multifunction card.
Figure 16:
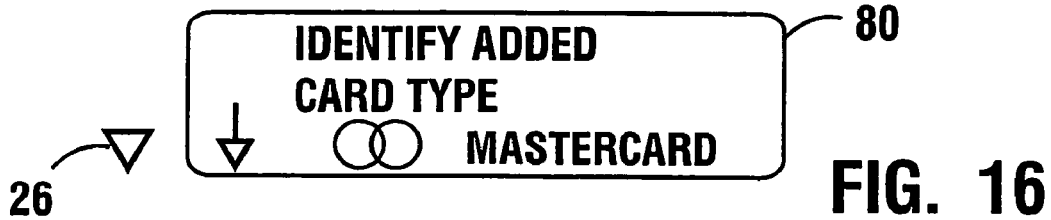

This routine begins as schematically indicated in FIG. 15 with screen 64. FIG. 15 is identical to FIG. 14, the screen being repeated herein for the sake of clarity. In response to a user pressing the enter button 28 a screen 80 of the type shown in FIG. 16 is presented. This screen includes a screen prompt which prompts the user to identify the type of card to be added. The memory on the multifunction card or the terminal preferably includes data representative of icons of major card types. These may include for example the icons representative of the logos for MasterCard®, VISA®, American Express®, Novus®, Discovery® and/or other common card types which a user is likely to want to enter. In screen 80 a MasterCard® logo is displayed by way of example, with an arrow indicating that other selections are available by pressing the down button 26.

Figure 17:

By pressing the down button from screen 80, screen 82 shown in FIG. 17 is displayed. This prompt screen includes the VISA® designator and logo, and allows the user to indicate that the card they are about to add is a VISA® card. The arrows adjacent to the VISAS logo displayed on the screen pointing both up and down indicates that the user may press the up or down buttons to display other card types. For purposes of this example it will be assumed that the card that the user wishes to add to the memory is a VISA® card. To indicate this the user presses the enter button 28 as indicated in FIG. 17.

Figure 18:
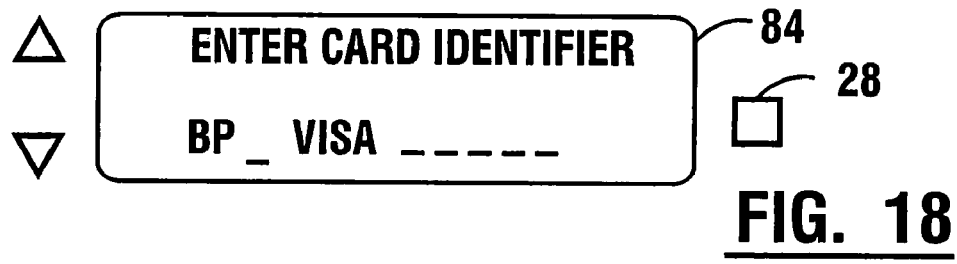

In the operation of the described embodiment the user is now requested to input a card identifier to distinguish the particular type of VISA® card which they are about to add to memory. This is done through a screen 84 which prompts a user to input a plurality of alphabetical or numerical characters which serve as a designator to identify the particular card. As shown in FIG. 18 the interface described enables a user to select letters of the alphabet to identify this particular type of card. For example by pressing and holding the up and down buttons the user is enabled to scroll through letters of the alphabet until they find the first letter of the designator they wish to input. When the letter is displayed they can enter that as the first letter of the designator by pressing the enter button 28. They can then move on to the next letter of the designator selecting it with the up and down buttons. When a space is desired to be entered the user can leave the blank space which is preferably included as the initial option. In the case of screen 84 the designator is BP_VISA which may be a designator for a VISA® card provided by British Petroleum. Once the user has entered their desired designator any leftover spaces may be simply left blank by repeatedly pushing the enter button 28. After all the spaces are filled the input of the designator is complete.

Figure 19:
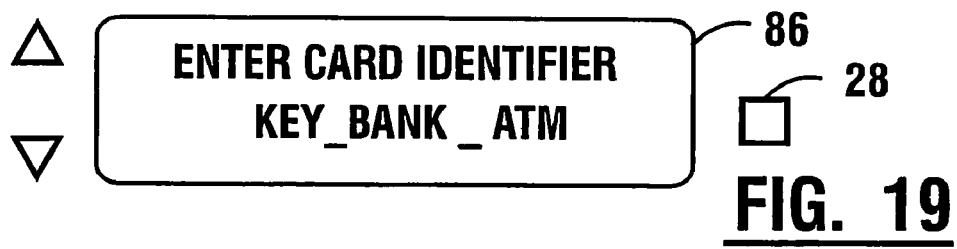

Screen 86 shown in FIG. 19 indicates the input of an alternative designator. In this screen the designator input is "KEY_BANK_ATM." This may indicate for example that the card which is being input is the debit card which corresponds to the user's account at Key Bank. It should be understood that the particular designator used is purely in the discretion of the user and the user is free to use highly descriptive terminology or a secret code which is known only to them to identify their various cards. In the exemplary form of the invention sufficient security is provided for accessing the memory on the multifunction card that the user is enabled to use descriptive terminology as a designator if they wish to do so.

Figure 20:
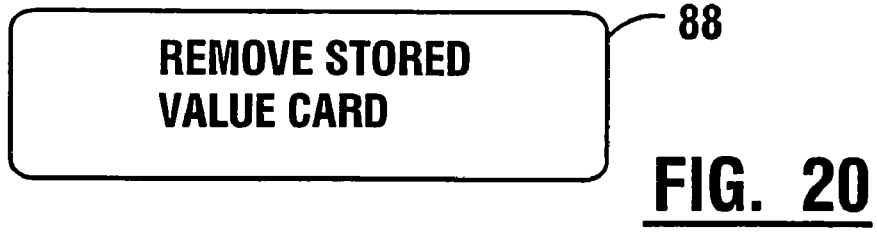
Figure 21:
Figure 22:

Once the designator has been input, the instructions read from the memory on the card or in the terminal causes a screen 88 shown in FIG. 20 to be displayed on the display 22. Screen 88 includes a prompt message to remove the stored value card from engagement with the portable terminal 14. Once the terminal senses that the stored value card has been removed by the disengagement of the contacts thereon with the portable terminal, a screen 90 shown in FIG. 21 is displayed. Screen 90 includes a prompt for the user to pass their original BP_VISA card through the portable terminal. As shown in the exemplary form of the invention the display further visually instructs the user on how to pass the original card through the terminal so that it is properly read by the magnetic stripe reading device. In response to the screen 90 a user preferably passes their original card through the slot 32 in the portable terminal. On sensing the proper reading of the magnetic stripe on the card, screen 92 shown in FIG. 22 is displayed. Screen 92 indicates to the user that the stripe has been properly read and that they should now reinsert the multifunction card face up.

It should be understood that the stored instructions may include provisions for a time out routine. In the event that the user fails to proceed to the next step at any point in the transaction, the time out returns the terminal to the main menu or to an off condition. Such a time out routine or failure routine may be accompanied by appropriate user prompts to advise the user why the terminal has proceeded to shut itself off or return to the main menu.

Figure 23:
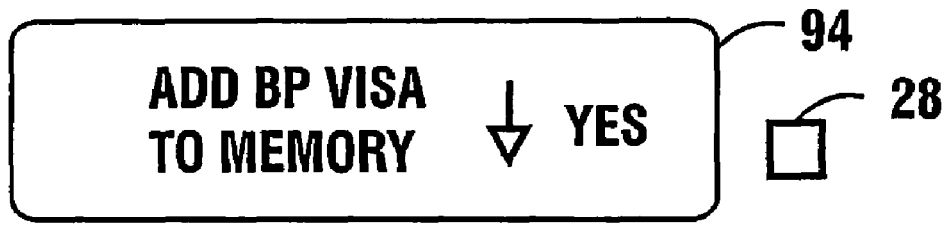
Figure 24:
Figure 94:
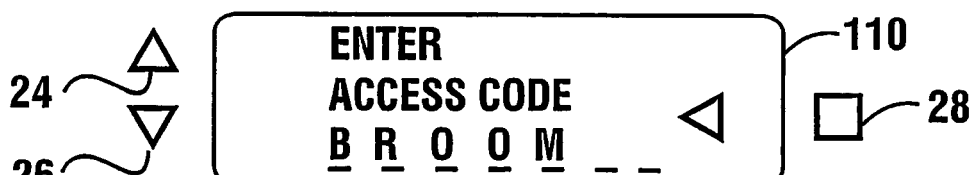

If from screen 92 the user reinserts the multifunction card into the slot 32, the logic flow next moves to display a screen 94 shown in FIG. 23. Screen 94 prompts the user as to whether they wish to add the BP_VISA card to the memory of the multifunction card. As shown in FIG. 94 the screen includes the default response which is "yes" with an arrow adjacent thereto which indicates to the user that they may change to other than the default response by pressing the down button 26. In this example the user wishes to add the card to the memory of the multifunction card, in which case the enter button 28 is pressed while screen 94 is displayed. This results in screen 96 shown in FIG. 24 being displayed, which indicates that the function has been carried out successfully. The user may press button 30 once to turn the terminal off or twice to return to the main menu.

Figure 25:
FIGS. 25-31 are a series of screens displayed on the programmable terminal and associated with the logic flow for deleting a card from the programmable memory on the multifunction card.

The logic associated with deleting information concerning a card from the memory of the multifunction card is now demonstrated with reference to FIGS. 25-31. This process begins with a screen 98. Screen 98 corresponds to screen 66 shown in FIG. 6 of the main menu. To choose this operation the user presses the enter button 28 as schematically indicated in FIG. 25. This causes the screen 114 shown in FIG. 26 to be displayed.

Figure 26:
Figure 27:
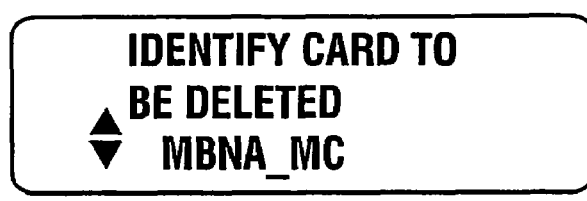

Screen 114 prompts a user to select which of the cards that are stored in the programmable memory on the card is to be deleted. The cards are referenced through displayed the designators which have been previously input by the user. Screen 114 displays the first one of these cards which has the designator "KEY_BANK_ATM." The arrows next to the designator indicate that the user may select other cards by pressing the up or down button. As shown in FIG. 26 the user presses the down button 26 which causes the display to move to a screen 116 shown in FIG. 27. Screen 116 displays the next card designator which is "MBNA_MC" which the user has previously input to designate an MBNA MasterCard. Assuming that the user wishes to select this card as the card to be deleted, they press the enter button 28 as schematically indicated in FIG. 27. Pressing the enter button from screen 116 causes a confirmation screen 118 shown in FIG. 28 to be displayed. This screen prompts the user to confirm that they want to delete that card. An arrow displayed next to the default option which is "yes" advises a user that they can change to another option by pressing the down button.

Figure 28:
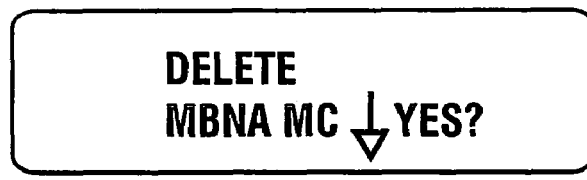
Figure 29:

In screen 118 shown in FIG. 28 if the user presses the enter button 28 as schematically indicated therein the terminal next displays screen 120 shown in FIG. 29 in which the terminal outputs an indication that the card has been deleted.

Figure 30:
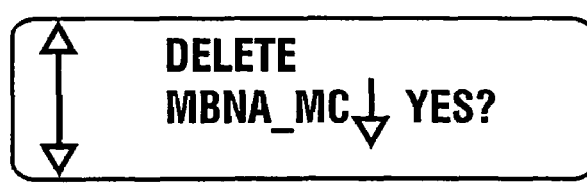
Figure 31:
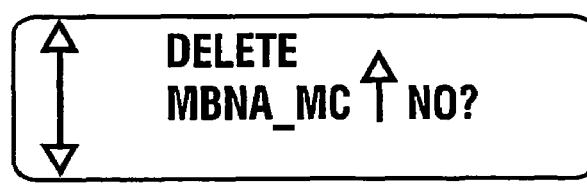
Figure 32:
FIGS. 32-42 are screens displayed on the portable terminal and associated with the logic flow for writing selected card information to the magnetic stripe of the multifunction card.
Figure 33:

Alternatively if from screen 118 shown in FIG. 28 the user presses the down button 26 as schematically indicated in FIG. 30, a screen 122 shown in FIG. 21 as displayed. Screen 122 shows that the selected card will not be deleted and pressing the enter button 28 from this screen will return the terminal to the main menu. Alternatively in screen 122 pressing the up button 24 returns to screen 118. It can be appreciated that the stored programmed instructions enable a user to correct errors that are made in the course of operating the input devices on the terminal.

The execution of the steps which enable the exemplary apparatus to configure the multifunction card so it may be used as a substitute for any one of a plurality of original magnetic stripe credit or debit cards, is now explained with reference to FIGS. 32-42. The logic executed to carry out this function begins with a screen 124. Screen 124 is identical to screen 68 of the main menu. As shown schematically with reference to FIG. 32, pressing the enter button 28 from screen 124 causes a screen 126 shown in FIG. 33 to be displayed. Screen 126 includes a prompt requesting that the user identify the card in the memory whose identifying indicia is to be transferred to the magnetic stripe of the multifunction card. The user is enabled to scroll through the designators for the cards stored in memory by pushing the buttons 24 and 26.

Figure 34:
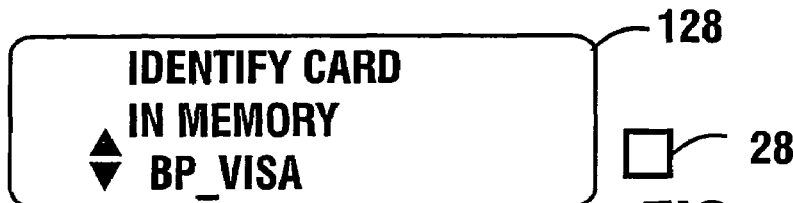

As indicated by a screen 128 in FIG. 34, the user selects the card data stored in correlated relation with the designator "BP_VISA" in the memory of the multifunction card by scrolling with the buttons until this designator is displayed and then pressing the enter button 28.

In response to the selection of the particular card in memory the indicia corresponding to the magnetic indicia on the "BP_VISA" card which has been stored in the memory of the multifunction card is transferred to the memory 38 of the terminal. Similarly the instructions which the processor will need to execute to complete the steps of writing the magnetic indicia onto the multifunction card are transferred temporarily into the memory of the terminal so that the steps may be completed with the memory of the multifunction card disengaged from the terminal.

Figure 35:
Figure 36:
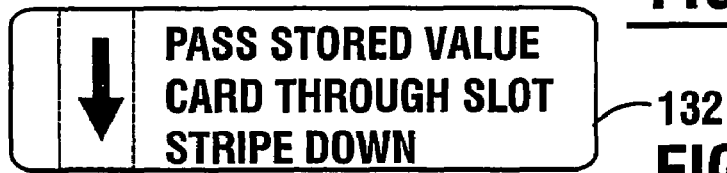

Once the necessary information has been loaded into the memory of the terminal a screen 130 shown in FIG. 35 is displayed. Screen 130 includes a prompt instructing the user to remove the multifunction card from engagement with the portable terminal. Upon sensing the disengagement of the multifunction card the screen 132 shown in FIG. 36 is presented by the portable terminal. Screen 132 includes a prompt for the user to pass the stored value card through slot 32 in the terminal. The prompt preferably includes instructions on the orientation of the card and the magnetic stripe. This is done so that any indicia that has been previously been recorded on the magnetic stripe of the multifunction card is erased.

Figure 37:

In response to screen 132 the user preferably passes the multifunction card through the portable terminal such that the magnetic stripe passes through an area of the slot in connection with an erase head which clears the magnetic stripe. Upon sensing that the card has been passed through the terminal a screen 134 shown in FIG. 37 is displayed by the portable terminal. The sensing can be done with the spring loaded finger in the slot or with another suitable stripe or card sensing device in the slot.

Figure 38:
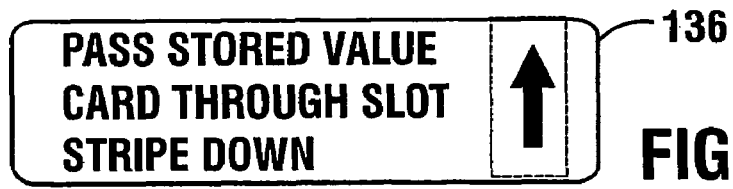

The portable terminal then further operates under control of the processor and the instructions stored in its memory 38 to display the screen 136 shown in FIG. 38. Screen 136 includes a prompt which includes an instruction for the user to now pass the multifunction card through the slot 32 in a different orientation so that the magnetic indicia corresponding to the selected BP_VISA card may be written to the magnetic stripe of the multifunction card. It should be noted that in the embodiment shown, the orientation of the card for erasing the stripe and for writing indicia to the stripe are different. This is done because a different head is used for erasing as opposed to reading and writing. In alternative embodiments a single head may perform both the erasing and writing functions or alternatively multiple heads may be aligned in the slot so that the card is passed in the same manner to carry out both the erasing, reading and writing functions.

Figure 39:

The exemplary form of the invention includes appropriate sensors and instructions so that if the multifunction card is inserted wrong, the screen such as screen 138 shown in FIG. 39 is displayed. This may be done based on the sensing finger sensing the card but the magnetic head not sensing the stripe which indicates an improper card orientation, or in other ways. This screen is displayed so that if the user begins to insert the card improperly they are prompted to make a correction. Removal of the card may return the terminal to the screen 136 or may abort the instruction sequence such as by displaying the screen 140 shown in FIG. 42.

Figure 40:
Figure 41:

If however the card has been passed through the portable terminal properly a screen 142 shown in FIG. 40 is presented. This screen indicates that the indicia corresponding to the magnetic indicia on the original BP_VISA card has been written to the magnetic stripe on the multifunction card. From screen 142 the terminal then moves to display a screen 144 shown in FIG. 41 indicating that the transaction is complete and the user may turn off the portable terminal by pressing the on/off button 30.

Figure 42:
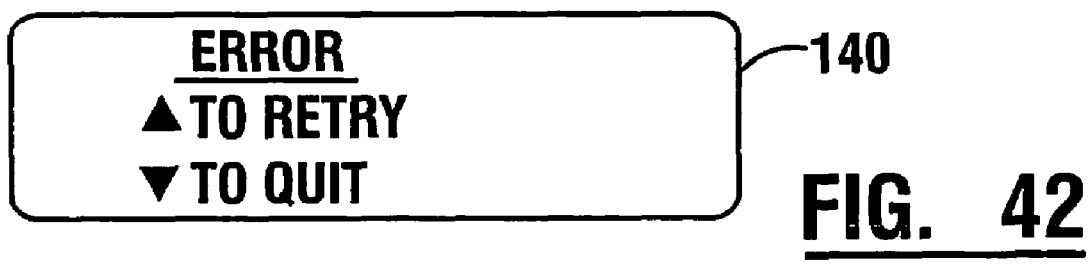

If for any reason an error has been sensed in carrying out the transaction, a screen 140 shown in FIG. 42 preferably appears. The user may then select either the option to retry the transaction to write the material to the card by pressing the up arrow, or may quit by pressing the down arrow which will return the terminal to the main menu. Alternatively in an exemplary embodiment of the invention pressing the on/off button 30 from screen 140 is also a suitable way to end the transaction.

Assuming that the selected card data has been written to the magnetic stripe on the multifunction card 12, the user may now take the multifunction card and present it to any standard transaction terminal which accepts that type of magnetic stripe card. For example if a user wishes to charge goods or services to their BP_VISA account, they may present that card to a merchant who passes the stripe through a point of sale terminal, electronic cash register or other appropriate terminal. This will result in the user's BP_VISA account being charged for those goods or services. Similarly if a user wishes to get cash out of an ATM and charge it to their BP_VISA account they may present the multifunction card to an ATM. The ATM may be operated in the usual manner as one would operate it using the original BP_VISA card.

The multifunction card may be configured to include the user's signature in a space on a face of the card. This would enable a merchant accepting the card to compare a user's signature on a transaction receipt to the signature on the card. Alternatively, or in addition, a reproduction of the user's signature may be stored in the memory on the card. The user could display a reproduction of their signature on the screen of the terminal so that a merchant could verify the signature. Alternatively, user identifying electronic signature data may be transmitted through a communications device such as by modem or infrared transmitter, or otherwise read from the terminal into the merchant's system, so that the merchant may store the electronic signature data from the terminal with the transaction data.

In alternative methods of operation the merchant may use an electronic signature capture system for transaction receipts. In such a system the merchant's computer system may include software to compare the signals generated by the user's actual signature on an electronic signature pad to the signature data stored on the card. Such comparisons would provide an indication where the signature data does not correspond to a sufficient degree, which may suggest that the user of the card is not the authorized user.

After completing a transaction the user may choose to leave the magnetic stripe data for the selected card on the stripe. Alternatively the user may choose to change the magnetic stripe to a different card. For example if the multifunction card has embossed data on the front corresponding to one particular card, the user may choose to return the magnetic stripe indicia to correspond with the indicia embossed on the front of the card. Alternatively the user may choose to completely erase the magnetic stripe data as may be done by returning the multifunction card to the terminal and repeating the steps associated with writing card data to the magnetic stripe up through the point in the steps where the magnetic indicia is erased from the magnetic stripe. The user may then exit the routine by pressing the on/off button leaving the card with a blank stripe. In embodiments where no information is embossed on the front of the multifunction card users may find this advantageous as the multifunction card is of absolutely no value as a credit or debit card unless the access code has been appropriately entered.

The exemplary forms of the present invention may also be used to selectively record and display visible indicia such as a bar code. These functions are graphically represented and the logic flow associated therewith explained with reference to FIGS. 43-61.

Figure 43:
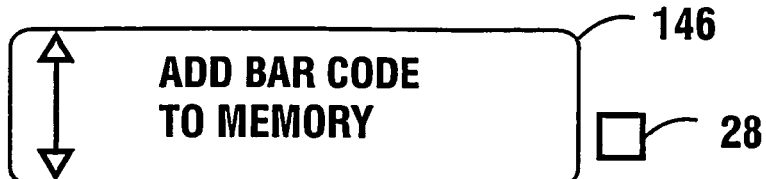
FIGS. 43-52 are screens displayed on the portable terminal and associated with the logic flow for adding a bar code to the programmable memory on the multifunction card.
Figure 44:
Figure 45:
Figure 46:

FIG. 43 shows a screen 146. Screen 146 is identical to screen 70 shown in FIG. 8 of the main menu. To select this function a user presses the enter button 28 from the main menu as schematically indicated in FIG. 43. From screen 146 a screen 148 is presented as shown in FIG. 44. Screen 148 prompts a user to enter a bar code ID or designator corresponding to a bar code that is to be read from an object. This is done in a manner similar to the entry of designators for credit or debit cards or entry of the access code. The user scrolls through alphabetical and numerical characters by pressing the up and down buttons 24 and 26 as represented by screens 150 and 152 shown in FIGS. 45 and 46 respectively, until a desired character is displayed in a desired position. When the desired character is reached, the enter button 28 is pressed at which point the user moves on to the next character.

Figure 47:

For purposes of this example it will be assumed that the user is going to scan a bar code off of a medical benefits identification card which the user has chosen to designate "BLU_CROSS ID." This is represented in FIG. 47 by a screen 154. The user indicates that they have completed the designator by pressing the enter button 28 a sufficient number of times to null any remaining spaces in the available spaces entry for characters.

Figure 48:
Figure 49:

Once the terminal is advised that the entire ID has been entered, the logic flow operates to display the prompt shown in screen 156 and FIG. 48. This prompt instructs a user to scan the bar code off the object such as their Blue Cross® identification card. The process also operates to initiate operation of the scanner component 50. The user then brings their identification card in proximity to the scanning device 34 on the housing of the portable terminal and the processor operates in response to the stored instructions to capture the bar code data on the card. When the bar code data has been captured, the screen 158 shown in FIG. 49 is displayed. As previously discussed, if the bar code cannot be read or is not read in a sufficient time, the instructions may include provisions for returning the terminal to screen 146 or providing a screen such as screen 160 shown in FIG. 52 in which the user is given the option to either quit or retry scanning the bar code.

Figure 50:
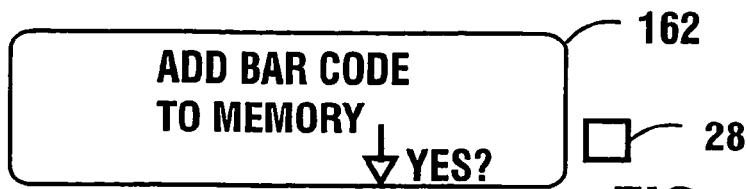
Figure 51:
Figure 52:
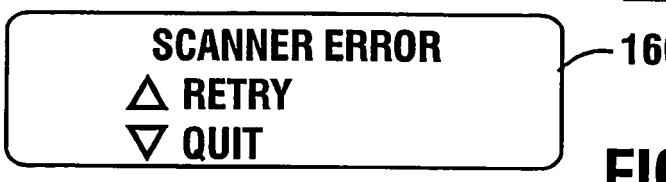

Assuming that the bar code is properly read as indicated by screen 158, the terminal then displays screen 162 shown in FIG. 50 which prompts a user as to whether they wish to add this bar code to the memory on the multifunction card. As is the case with prior prompts the default value is "yes", but the user is enabled to change the default to a "no" by pressing button 26. For purposes of this example it will be assumed that the user wishes to add the bar code for their medical identification card to the memory which they do by pressing button 28 in response to screen 162. In response to the user pressing the enter button the screen 164 shown in FIG. 51 is displayed. The user can now turn the terminal off by pressing button 30.

It should be understood that while the type of visual indicia added to the memory on the multifunction card in the foregoing example is bar code associated with a medical plan, other types of bar code may be added. For example the multifunction card may be used to store data representative of bar code associated with a driver's license, student identification card, employee access card, library card or any other type of bar code. In addition the system may be configured to read and store other types of visual indicia which are capable of being read, stored and reproduced.

Figure 53:
FIGS. 53-56 are screens displayed by the programmable terminal and associated with the logic flow for displaying a bar code corresponding to information stored on the programmable memory of the multifunction card.

When a user desires to use the terminal to display one of the bar codes or other indicia stored in memory, they may do so from a screen 166 shown in FIG. 53. Screen 166 is identical to screen 74 in the main menu. To proceed with the display of a selected bar code the user presses the enter button 28 as schematically indicated.

Figure 54:

In response to the user selecting the display bar code routine from the main menu, the terminal proceeds to display a screen 168 shown in FIG. 54. Screen 168 asks the user to identify the bar code that they wish to display. The user is enabled to select designators for the various bar codes stored in the memory of the multifunction card. This is done using the up and down buttons on the terminal device.

Figure 55:
Figure 56:
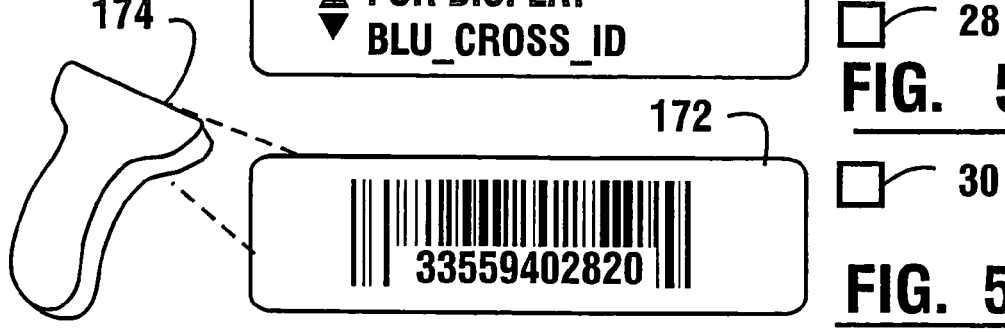
Figure 57:
FIGS. 57-61 are screens displayed on the portable terminal and associated with the logic flow for deleting a bar code from the programmable memory on the multifunction card.
Figure 58:
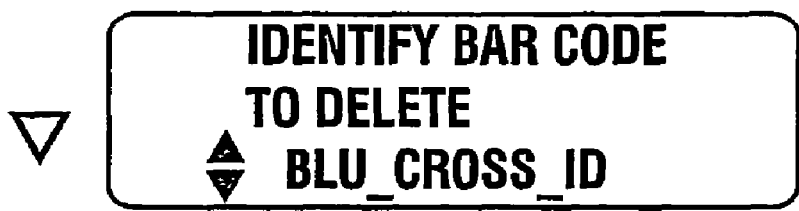

Assuming for purposes of this example that the user wishes to display their medical plan ID, the designators for the various stored bar code indicia are scrolled through by pressing the buttons until the medical plan ID designator is displayed, which is represented by a screen 170 in FIG. 55. In response to pressing the enter button 28 the processor is operative to retrieve the data corresponding to the bar code in the memory and to display a reproduction of the bar code on the terminal. This is represented by a screen 172 in FIG. 56. The displayed reproduction of the bar code may be scanned from the display 22 of the portable terminal using the scanner or similar bar code reading device which is schematically represented by a scanner 174 in FIG. 56. Thus the user may identify themselves to a medical provider as a participant in their medical plan and the user may input their identifying information in the conventional manner using the same scanner that is used for scanning a regular identification card. When the scanning process is finished, the user can discontinue the display of the bar code by pressing on/off button 30.

The bar codes which have previously been stored in the memory associated with the multifunction card may also be selectively erased therefrom. This may be done for example when a user's regular card is replaced such that a new bar code or other visual indicia is associated therewith. Alternatively a user may simply wish to discontinue the use of a particular card. This may happen for example with regard to a library card which a user had been using in a city where they previously resided. Once the user moves they no longer use that library. Likewise a user may delete their driver's license data when they move to another state and obtain a new license.

Figure 59:
Figure 60:
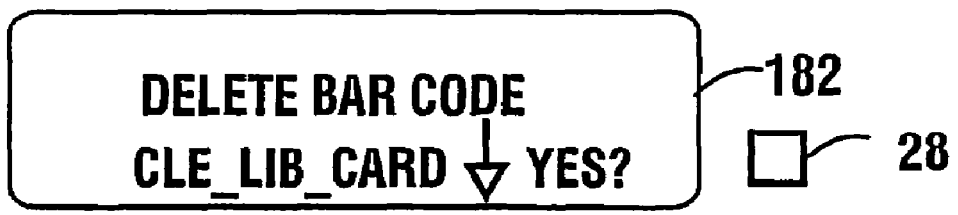
Figure 61:

The deletion of a bar code from the memory is represented by the logic flow associated with FIGS. 57-61. The screen 176 corresponds with the screen 72 in the main menu, and includes a prompt which enables a user to select the logic which operates to delete a bar code from the memory. The user selects this transaction by pressing the enter button 28. A screen 178 is then displayed which asks a user to identify the bar code they wish to delete from the memory. The user selects the bar code by pressing the up and down buttons 24 and 26. As shown in FIG. 59 the user selects a card which has the associated designator "CLE_LIB_CARD" stored in association therewith in the memory of the multifunction card. This is represented by a screen 180. Pressing the enter button 30 with the bar code designator displayed causes a screen 182 shown in FIG. 60 to be displayed. Screen 182 queries the user as to whether they in fact wish to delete that particular bar code. The user is enabled to change from the default setting by pressing the down button. As schematically represented in FIG. 60, assuming the user wishes to delete that particular bar code from memory they press the enter button 28. This causes a screen 184 shown in FIG. 61 to be displayed on the portable terminal. This screen includes the prompt message to indicate that the bar code has been deleted. The user may then exit the routine by pressing the on/off button 30.

It should be understood that while the described embodiment operates to store and to reproduce visible indicia corresponding to bar code, other embodiments of the invention may produce other forms of indicia. This may include visual indicia that is intended to be read by machines for identification purposes as well as indicia intended to be read by the human eye. Any form of indicia which can be read, stored in the memory of the multifunction card and/or displayed on the portable terminal is intended to be encompassed by the present invention. As previously discussed, a user's signature is a further example of visual indicia that may be stored and selectively reproduced. Such indicia may also be transmitted by the terminal to a remote system and used to verify the authenticity of a transaction or for other purposes.

The exemplary form of the present invention also operates as a stored value card system and transaction apparatus which operates to store value equivalent to a cash value in the memory of the multifunction card, as well as to transfer value between the card and various accounts. The programmable memory 18 on the multifunction card 12 may include therein any one of a number of different public or proprietary schemes for storing information representative of cash value. This value storage method may be compatible with other terminals which may read the memory and transfer data representative of value to or from the memory, while also operating to transfer funds between accounts of the user and providers of goods, services or cash.

It should be understood that the multifunction card of exemplary embodiments may store value in one or several forms of proprietary schemes. For example the card may have cash value stored and associated with a Mondex® scheme. It may have a different cash value stored and associated with a VISA® CASH scheme. The card may also store data representative of cash values in any one of several other schemes. Although the present invention will be described with respect to a card in which value representative of cash is stored thereon with respect to a single scheme, it should be understood that multiple schemes may be used. Further in the following description in which amounts may be transferred between accounts of the user, it is within the scope of the invention to transfer amounts between one stored value proprietary scheme stored in the programmable memory of the card to another proprietary scheme stored within the card. Such transfers may be made in a manner similar to transfers between accounts which are carried out by the terminal as described hereafter, although it should be understood that in such situations additional steps are carried out by the processor in the portable terminal so as to decrement and increment the various stored value amounts stored in the memory of the card.

To facilitate accounting for such transactions it will also be desirable for the portable terminal to connect to various remote locations which provide gateways to electronic transaction systems and networks which assure that funds are properly accounted for. For example communication will be carried out with various remote systems to assure that indications are provided that a user has transferred cash value on their card from one stored value card scheme to another.

Figure 62:
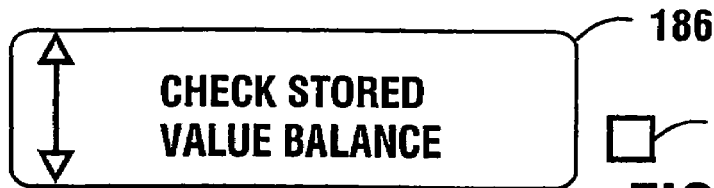
FIGS. 62 and 63 are screens displayed on the portable terminal and associated with the logic flow for checking the stored cash value represented by the data stored in the programmable memory on the multifunction card.
Figure 63:
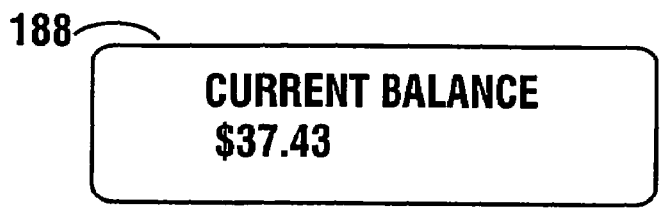

One of the common functions that a user will execute in connection with the exemplary apparatus of the invention is to check the stored value representative of cash that is stored on the programmable memory of the multifunction card. This is represented by the logic flow described with reference to FIGS. 62 and 63. FIG. 62 shows a screen 186. Screen 186 corresponds to screen 76 of the main menu. Screen 186 prompts a user as to whether they wish to check the stored value balance on their multifunction card. To do so the user presses the enter button 28. In response to the user selecting this item from the main menu the memory of the card is read and processor 36 causes a screen 188 shown in FIG. 63 to be displayed on the portable terminal. This screen indicates to the user the current cash value stored on the card. If the multifunction card includes stored value schemes for several different programs, intermediate screens may be provided to prompt the user to select one of the several stored value schemes which are employed on the card. As shown in FIG. 63 when a user has finished displaying the stored value amount they may exit by pressing the on/off button 30.

Figure 64:
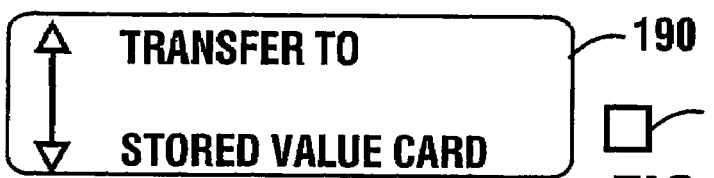
FIGS. 64-74 are screens displayed on the portable terminal and associated with the logic flow for transferring cash value to the programmable memory on the multifunction card.
Figure 65:

The transfer of funds to the memory of the stored value card is represented by FIGS. 64-74. FIG. 64 shows a screen 190. Screen 190 corresponds to screen 80 in FIG. 13 of the main menu. A user selects the transaction which includes a transfer of value to their stored value card (which is the multifunction card) by pressing the enter button 28 when screen 190 is displayed.

To transfer value representative of cash value onto the memory of the multifunction card, a source of the money to be transferred is identified. This is done by the processor operating in response to the instructions stored on the card to display a screen 192 shown in FIG. 65. Screen 192 prompts a user to identify the source of the money to be added into the memory of the card. The user is enabled to select the source by pressing the up and down buttons which causes the various sources of available funds to be selected. Such sources may include money stored in stored value schemes on the memory of the card itself. In the case of screen 192 if the user indicates that they want the source of funds to be their BP_VISA card, this is indicated by pressing the enter button 28 when this card designator is displayed.

Figure 66:
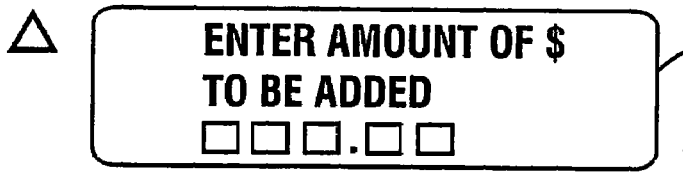
Figure 67:
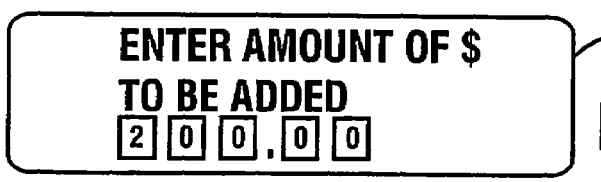
Figure 68:

After the source of the funds is designated, a screen 194 shown in FIG. 66 is displayed. This screen prompts the user to enter the amount of money to be added to the card. This is done by the user entering a numerical amount in a manner similar to the way that access codes and designators have been previously entered. However in the exemplary form of the invention only numerals may be entered in this step. The user enters the numerical values by scrolling to the particular numerical value desired and then hitting the enter button 28. This causes the program logic to move to the next value. After all the value characters have been entered as represented by screen 196 in FIG. 67 the user is prompted through a screen 198 shown in FIG. 68 as to whether they want to add the amount input to their stored value card. As shown in screen 198 the default value is "yes" however the user may change this to "no" by pressing the down button. For purposes of this example it will be assumed that the user wishes to add that amount and so indicates by pressing the enter button 28.

In response to the user indicating that they wish to add this amount to the data representative of value in the memory of the multifunction card, the processor operates in response to instructions stored on the card memory to contact the remote location appropriate to obtain funds from the user's BP_VISA account, and to indicate that the amount has been transferred onto the user's stored value card. In one form of the invention this is accomplished by the processor causing the communications component 52 to dial up the remote location. This is done using the address appropriate for making the connection which is preferably stored in memory on the card. In this case the address may be a telephone number. In alternative forms of the invention the address which the communications component uses to contact the appropriate location may be a node or TCP/IP address in a computer system such as a private intranet or public system such as the internet. The particular approach depends on the nature of the system in which the portable terminal 14 is intended to operate.

Figure 69:
Figure 70:

The portable terminal exchanges messages with the remote location and the computer system therein, which operates to charge the user's account for the funds which are to be transferred as cash value onto the stored value card. Alternatively the terminal may communicate to a number of locations to indicate both the charge to the user's account as well as to track accounting entries, so that it is recorded that the user now has such funds available in their particular stored value scheme. Various transaction messages are transferred between one or more remote locations and the portable terminal so as to accomplish the transfer of funds. These messages may be in an ISO 8583 format or appropriate variants thereof, or other proprietary message formats of suitable types, so as to accomplish the transfer of funds and a record thereof. In one exemplary embodiment, while the remote terminal is connecting to the address a screen 200 shown in FIG. 69 is presented on the display of the remote terminal. As the remote terminal exchanges messages with the remote locations to transfer the funds after the connection has been made, the display of the remote terminal may present the screen 202 shown in FIG. 70 to indicate that the transaction is going forward.

Figure 71:
Figure 72:

If the transaction is successfully completed the remote terminal displays a screen 204 shown in FIG. 71 to indicate a transaction has been approved. The logic next moves to cause a screen 206 to be displayed. Screen 206 which is shown in FIG. 72 is operative to show the user the new stored value balance stored on the multifunction card.

Figure 73:
Figure 74:
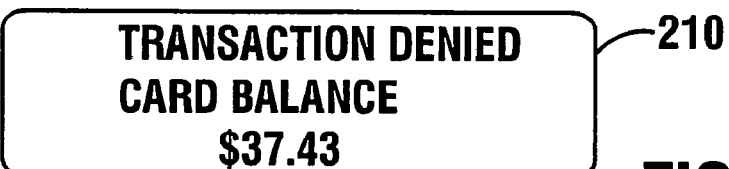

If for some reason the terminal is unable to make connections to the remote location, either because it is unable to make a connection or because of some other malfunction, a screen 208 shown in FIG. 73 may be displayed. This screen prompts a user to select whether to retry the transaction or to quit. Similarly the user may decide to turn the terminal off by pressing the on/off button 30. Alternatively the user's request to transfer the funds may be denied by the remote location, such as because it would put the user over their credit limit. In such circumstances the instructions stored in the multifunction card are received from the remote location and causes screen 210 shown in FIG. 74 to be presented on the terminal. This screen shows the user that the transaction was denied and that their card balance remains at the prior amount. Of course the user is free to again attempt the transaction using a different source of funds, or alternatively to transfer funds from a different stored value scheme stored on the memory of the card.

The exemplary form of the invention also enables transferring the value from the stored value card to one of the user's accounts. This may include for example a checking or savings account which the user maintains with a financial institution. Alternatively this may include transferring value from one stored value scheme stored on the card to another stored value scheme stored on the card.

Figure 75:
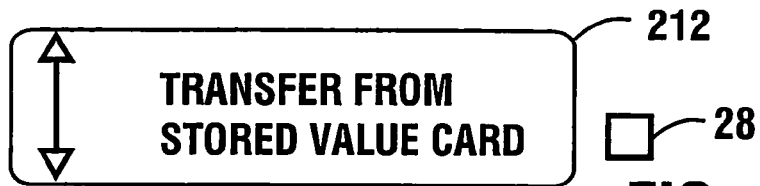

The transfer of value from the stored value card is commenced in an exemplary embodiment of the invention from a screen 212 shown in FIG. 75. Screen 212 corresponds to screen 78 in the main menu. Pressing the enter button from this screen causes the processor to execute various instructions on the multifunction card associated with this transaction.

Figure 76:

In executing the transfer from the card the user is next prompted through a screen 214 shown in FIG. 76 to identify a destination of the finds. This is done by user using the up and down buttons to select one of the available destinations. In this case the user has selected the account associated with the designator "KEY_BANK_ATM." The selection is made by pressing the enter button 28.

Figure 77:
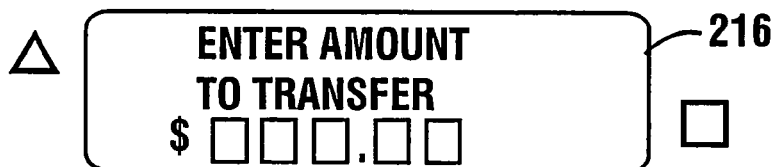
Figure 78:
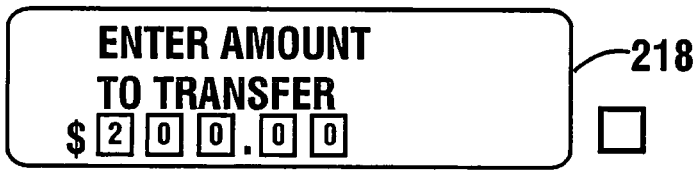

As shown in FIG. 77 the user must next enter an amount to be transferred from the memory of the stored value card into the designated account. The user must enter an amount which is prompted through a screen 216. The entry of an amount is accomplished in the manner previously described by using the up and down buttons and the enter button. In the case of this example the user enters an amount to transfer of $200 as indicated by screen 218 in FIG. 78.

Figure 79:
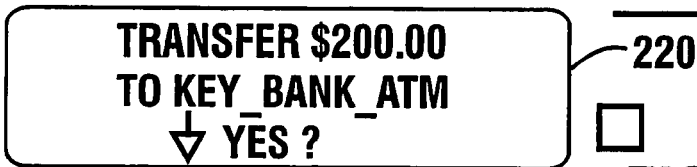
Figure 80:
Figure 81:

In response to the user entering the transfer amount the terminal next operates to display a screen 220 shown in FIG. 79 in which the user is asked to confirm that they wish to make the transfer to the particular account. In the situations where the user is obtaining funds from financial institutions or other sources where they may have multiple accounts, the user may be prompted through additional screens to select particular accounts that may be held at the institutions which are sources of funds. This is demonstrated in FIGS. 80 and 81. For example in screen 222 the user is first prompted to state whether they wish to transfer funds to savings. By pressing the down button the user may cause screen 224 to be displayed which then asks them if they prefer to transfer the funds into checking. For purposes of this example it will be assumed that the user wishes to transfer the funds to checking, which they select by pressing button 28 as shown in FIG. 81.

When the user is transferring funds to or from a debit card account, the PIN number uniquely associated with the user's account is required to be input to gain access. The nature of the account which the user has identified as the destination or source of funds, is generally indicative that a PIN number is required for access thereto. The instructions stored in memory on the card or the memory of the terminal may cause screens associated with the entry of a PIN number and/or the selection of various accounts to be displayed when particular accounts are selected.

In the present example because a bank account which requires the entry of a PIN number is being used as the destination of the funds, the stored instructions cause a screen 226 shown in FIG. 82 to be displayed. Screen 226 prompts the user to input a PIN number. The user inputs their PIN number either by alphabetic or numerical characters in the manner previously described for entry of designators and numerical values into the remote terminal. Once the user has completed the input of their PIN number as indicated by a screen 228 in FIG. 83, they are presented with a prompt that asks them to confirm the PIN number input. Confirming the input in response to this prompt is done by pressing the enter button 28. In embodiments where the biometrics reader is used, biometric data may be used in addition to or in lieu of a PIN to identify the user to a remote system. Alternatively, a user's PIN number may be stored on the card. If the user has first identified themselves with an access code or biometric data to operate the terminal with the card, the level of security may be considered already sufficient that the PIN may be recalled from memory and forwarded by the terminal. Alternatively, the user may be required to input biometric data and in response to the proper biometric input the PIN is recovered from the card memory and output by the terminal.

After the data required to conduct a transaction has been input, the user is questioned concerning whether they wish for the transaction to proceed. As shown in FIG. 84 a screen 230 is presented which prompts the user to confirm that they wish the transaction to go forward. Confirmation is presented by pressing the enter button. In response thereto the remote terminal contacts the appropriate computer address to transfer the funds to the account designated. While this is being done the screens 232 and 235 shown in FIGS. 85 and 86 are displayed. As previously discussed contact may be via a phone system or by computer network to the appropriate address.

If the transaction is successfully completed the instructions cause the screen 236 shown in FIG. 87 to be displayed. In the exemplary form of the invention the instructions then cause the display of the screen 237 which shows the user the amount of value remaining on the card.

While various methods of communicating between the remote terminal and the remote locations may be used, in one exemplary embodiment of the invention it is desirable for the communications device to include a wireless modem. The wireless modem enables communication over a cellular telephone network. Appropriate encryption is provided to enhance security. This enables a user to transfer funds between the multifunction card and their various accounts from any convenient location where the user happens to be. This may be particularly advantageous when a user finds that they are in need of cash and do not have an automated teller machine or a telephone line readily available. The user is enabled to load cash value onto the multifunction card so they can complete their transactions.

In addition while the exemplary form of the invention has been described as being used to make transactions from value stored on the card to various accounts of the user, forms of the invention may also be used to transfer funds from the stored value card of one user to the stored value card of another user. This enables users to carry out the equivalent of cash transactions using stored value cards. In such circumstances the terminal would contact the appropriate remote locations for recording the transfers of funds for accounting purposes, if necessary. Alternatively if sufficient security is provided, the electronic information corresponding to cash value may be deemed sufficiently self-authenticating so that no independent accounting of the cash value need be kept in an external system.

Alternative forms of the present invention may also be used in various ways. For example, forms of the present invention may enable an authorized user to create duplicate credit or debit cards which they may provide to trusted friends or family members on a temporary basis. This will enable such individuals to access funds of the user when needed. This may be appropriate for example when family members are traveling and are separated from the primary card user.

As will be appreciated the exemplary form of the present invention enables a user to continue to use a large number of credit cards, debit cards and other various forms of cards and objects bearing indicia, without having to carry those cards on their person. As a result the user is enabled to keep such cards at home or another secure location where they are less likely to be lost or stolen.

Further the exemplary form of the present invention is highly flexible in configuration and can accommodate a number of different types of transactions depending on the instructions stored in the memory of the multifunction card and/or the portable terminal. As a result the apparatus and method of the exemplary form of the present invention is highly and readily adaptable to the carrying out of different or additional transaction types, whether financial or otherwise.

Thus the new transaction apparatus and method of the present invention achieves at least one of the above stated objectives, eliminates difficulties encountered in the use of prior devices and systems, solves problems and attains the desirable results described herein.

In the foregoing description certain terms have been used for brevity, clarity and understanding. However no unnecessary limitations are to be implied therefrom because such terms are used for descriptive purposes and are intended to be broadly construed. Moreover the descriptions and illustrations given herein are by way of examples and the invention is not limited to the exact details shown and described.

In the following claims any feature described is a means for performing a function shall be construed as encompassing any means capable of performing the recited function known to those skilled in the art, and shall not be limited to the particular means shown in the foregoing description as performing the recited function or means merely equivalent thereto.

Having described the features, discoveries and principals of the invention, the manner in which it is constructed, operated and utilized, and the advantages and useful results attained; the new and useful structures, devices, elements, arrangements, parts, combinations, systems, equipment, operations, methods and relationships are set forth in the appended claims.

The invention claimed is:

1. A method comprising:
   (a) initiating a financial transaction that involves a transaction computer and requires customer signature and customer account information;
   (b) operating a portable apparatus including a wireless customer phone device during the financial transaction to cause customer-identifying electronic signature data to be transmitted wirelessly from the apparatus and communicated via the Internet to the transaction computer.

2. The method according to claim 1 wherein the apparatus comprises a user card having a programmable memory, and further comprising
   (c) prior to step (a), storing the signature data in the programmable memory.

3. The method according to claim 2 and further comprising
   (d) storing account data representative of customer account information in the programmable memory;
   (e) operating the apparatus during the financial transaction to cause the account data to be transmitted wirelessly from the apparatus.

4. The method according to claim 1 wherein the apparatus includes a magnetic stripe reader, and further comprising
   (c) reading account data from a magnetic stripe of a card;
   (d) storing the account data read in step (c) in memory of the apparatus; and
   (e) subsequent to step (d), operating the apparatus during the financial transaction to cause the account data to be transmitted wirelessly from the apparatus and communicated via the Internet to the transaction computer.

5. The method according to claim 4 wherein a merchant system includes the transaction computer, and further comprising
   (f) responsive to step (b), receiving the signature data at the merchant system;
   (g) responsive to step (e), receiving the account data at the merchant system.

6. The method according to claim 1 wherein step (b) includes connecting the apparatus to the Internet.

7. The method according to claim 6 wherein step (b) causes wireless Internet communication of the signature data from the apparatus.

8. The method according to claim 7 wherein step (b) includes operating the phone device to cause wireless Internet communication of the signature data from the phone device.

9. The method according to claim 1 wherein step (b) includes operating the phone device to wirelessly transmit the signature data from the phone device.

10. The method according to claim 9 wherein step (b) causes the signature data to be wirelessly transmitted from the phone device to an address, and then transmitted from the address to the transaction computer.

11. The method according to claim 10 wherein step (b) causes the signature data to be wirelessly transmitted via a cellular phone network to the address.

12. The method according to claim 11 wherein the address comprises an Internet address, wherein step (b) causes the signature data to be wirelessly transmitted via the cellular phone network to the Internet address.

13. The method according to claim 9 wherein a merchant system includes the transaction computer, wherein step (b) occurs during a purchase transaction involving a merchant and a customer.

14. The method according to claim 13 and further comprising
   (c) responsive to step (b), receiving the signature data at the merchant system.

15. The method according to claim 14 and further comprising
   (d) storing account data representative of financial account information in memory of the apparatus;
   (e) operating the apparatus during the financial transaction to cause the account data to be transmitted wirelessly from the apparatus and communicated via the Internet to the merchant system; and
   (f) responsive to step (e), receiving the account data at the merchant system.

16. The method according to claim 9 wherein the phone device comprises a cell phone, and wherein step (b) includes operating the cell phone to wirelessly transmit the signature data from the cell phone.

17. The method according to claim 9 wherein the signature data includes hand-written signature data corresponding to a customer-identifying hand-written signature, and further comprising
   (c) prior to step (a), storing the hand-written signature data in a memory of the apparatus.

18. The method according to claim 17 and further comprising
   (d) prior to step (c), electronically reproducing a customer-identifying hand-written signature,
   wherein step (c) includes storing hand-written signature data corresponding to the customer-identifying hand-written signature electronically reproduced in step (d) in the memory.

19. The method according to claim 9 wherein the apparatus includes a programmable memory, wherein step (a) includes storing the signature data in the programmable memory, wherein the apparatus enables a user thereof to transfer funds between the programmable memory and financial accounts, and further comprising
   (c) operating the apparatus to transfer funds between the programmable memory and a financial account.

20. At least one computer readable medium including computer executable instructions, wherein the instructions, when executed by at least one computer, cause a method including:
   (a) initiating a financial transaction that involves a transaction computer and requires customer signature and customer account information;
   (b) operating a portable apparatus including a wireless customer phone device during the financial transaction to cause customer-identifying electronic signature data to be transmitted wirelessly from the apparatus and communicated via the Internet to the transaction computer.

* * * * *